(12) United States Patent
Nomura

(10) Patent No.: US 6,795,581 B1
(45) Date of Patent: Sep. 21, 2004

(54) CONTINUOUS GRADATION COMPRESSION APPARATUS AND METHOD, CONTINUOUS GRADATION EXPANSION APPARATUS AND METHOD, DATA PROCESSING APPARATUS AND ELECTRON DEVICE, AND MEMORY MEDIUM STORING PROGRAMS FOR EXECUTING SAID METHODS

(75) Inventor: Yoshiro Nomura, Katsushika-ku (JP)

(73) Assignee: Force Technology Corp., Tokyo (JP)

( * ) Notice: Subject to any disclaimer, the term of this patent is extended or adjusted under 35 U.S.C. 154(b) by 0 days.

(21) Appl. No.: 09/555,266

(22) PCT Filed: Nov. 5, 1998

(86) PCT No.: PCT/JP98/04982

§ 371 (c)(1),
(2), (4) Date: May 26, 2000

(87) PCT Pub. No.: WO99/30483

PCT Pub. Date: Jun. 17, 1999

(30) Foreign Application Priority Data

Dec. 5, 1997 (JP) .............................. 9-335633

(51) Int. Cl.[7] ................................ G06K 9/36
(52) U.S. Cl. ..................................... 382/232
(58) Field of Search ............................... 382/232, 243, 382/254, 255, 298, 299; 358/521, 530, 501

(56) References Cited

U.S. PATENT DOCUMENTS

| 4,757,383 A | 7/1988 | Nobuyuki |
| 5,161,035 A | 11/1992 | Muramatsu |
| 5,400,371 A | 3/1995 | Natarajan |
| 5,410,643 A | 4/1995 | Yomdin et al. |
| 5,510,838 A | 4/1996 | Yomdin et al. |
| 5,708,729 A | 1/1998 | Adams et al. |
| 5,905,814 A | 5/1999 | Mochizuki et al. |

FOREIGN PATENT DOCUMENTS

| EP | 841 636 A2 | 5/1998 |
| JP | 62-17288 A | 7/1987 |
| JP | 62-247687 A | 10/1987 |
| JP | 1-320869 A | 12/1989 |
| JP | A-2-35884 | 2/1990 |
| JP | 2-35884 A | 2/1990 |
| JP | 2-137476 A | 5/1990 |
| JP | A-2-137476 | 5/1990 |
| JP | 2-141176 A | 5/1990 |
| JP | A-2-141176 | 5/1990 |
| JP | 3-201673 A | 9/1991 |
| JP | 4-233085 A | 8/1992 |
| JP | 8-294086 A | 11/1996 |
| JP | 10-126275 A | 5/1998 |
| JP | 10-145590 A | 5/1998 |
| WO | wo 91/19263 | 12/1991 |

OTHER PUBLICATIONS

IEEE Transactions on Biomedical Engineering, Vo. 40, No. 6, Jun. 1993, K. Toraichi "Compressing Data Volume of Left Ventricular Cineangiograms" p. 579–588, Jun. 1993.

*Primary Examiner*—Leo Boudreaj
*Assistant Examiner*—Duy M. Dang
(74) *Attorney, Agent, or Firm*—Oliff & Berridge, PLC

(57) ABSTRACT

An image processing apparatus by which an excellent image can be obtained even after compression and expansion. A compression circuit (12) has a line scanning unit which divides original image data into color data groups in relation to respective pixels, a line compression unit (24) which expresses the value (y) of the color data corresponding to each pixel position in a predetermined section with a polynomial: $y = ax^3 + bx^2 + cx + d$ wherein (x) denotes the pixel position which is a variable and a coefficient calculation unit (26) which obtains the color data values corresponding to the respective pixel positions in accordance with the received coefficients and pixel positions. The restored image data are outputted to a display apparatus, etc.

23 Claims, 19 Drawing Sheets

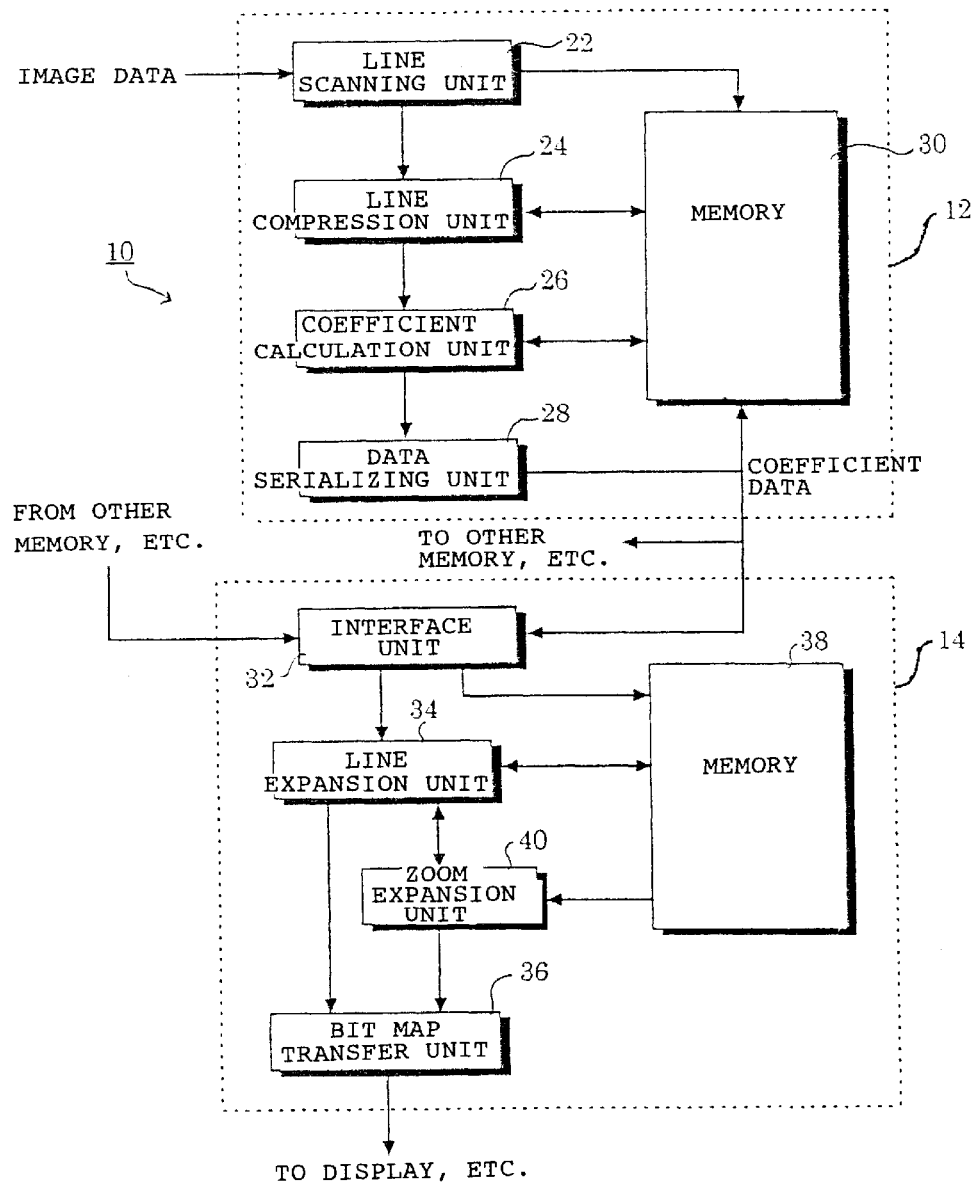
[FIG. 1]

[FIG. 2]
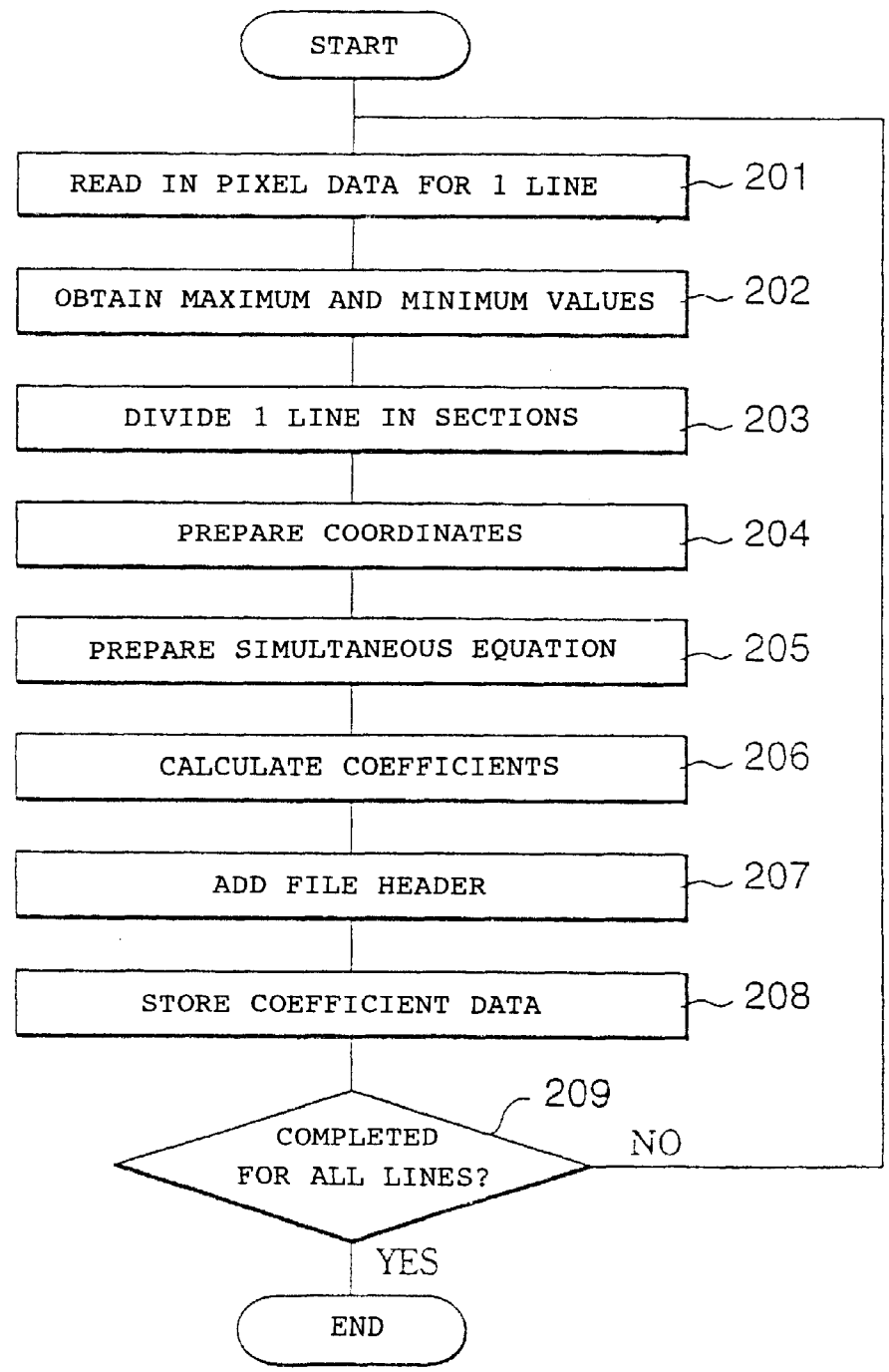

[FIG. 3]
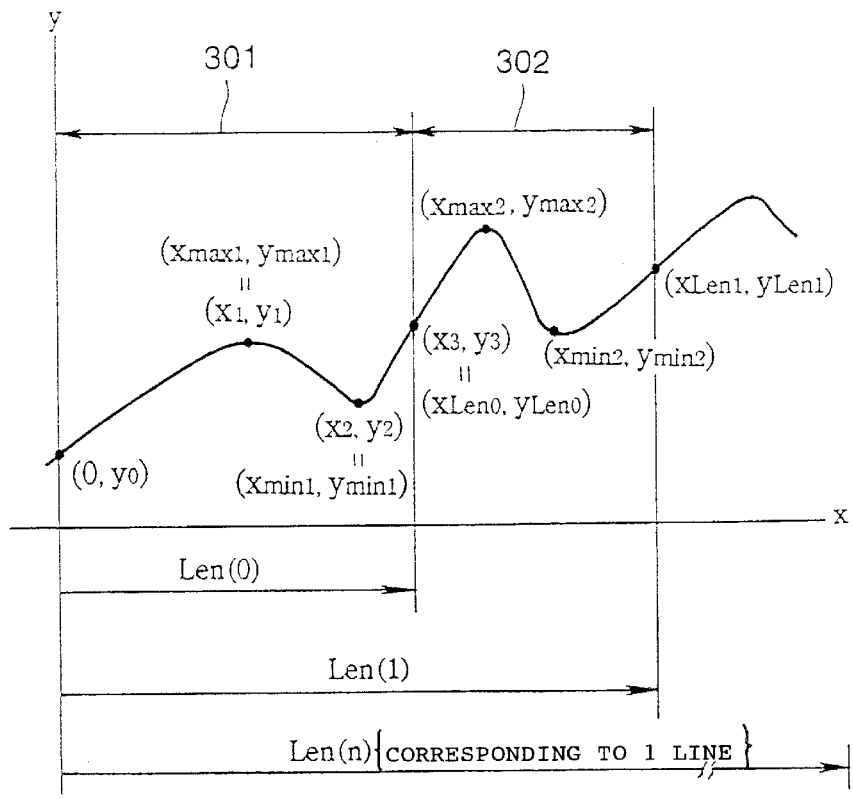
[FIG. 4]
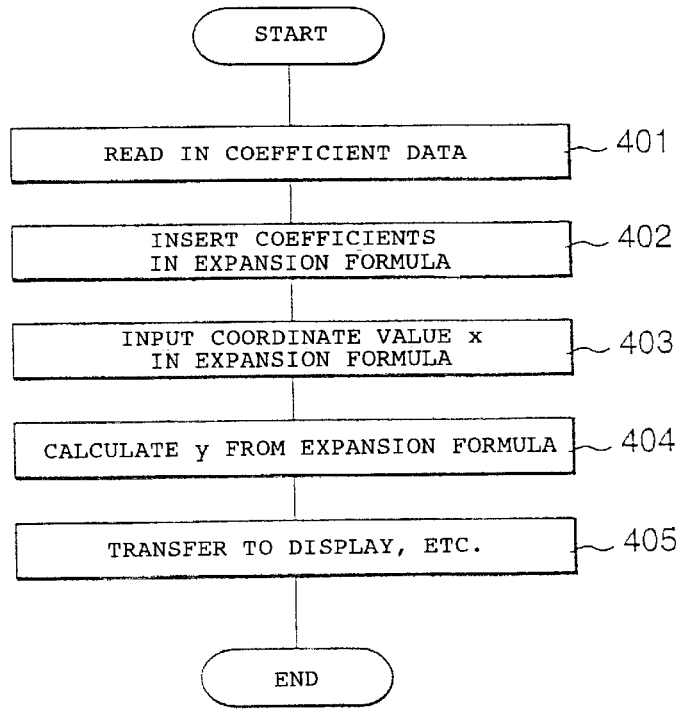

[FIG. 5]
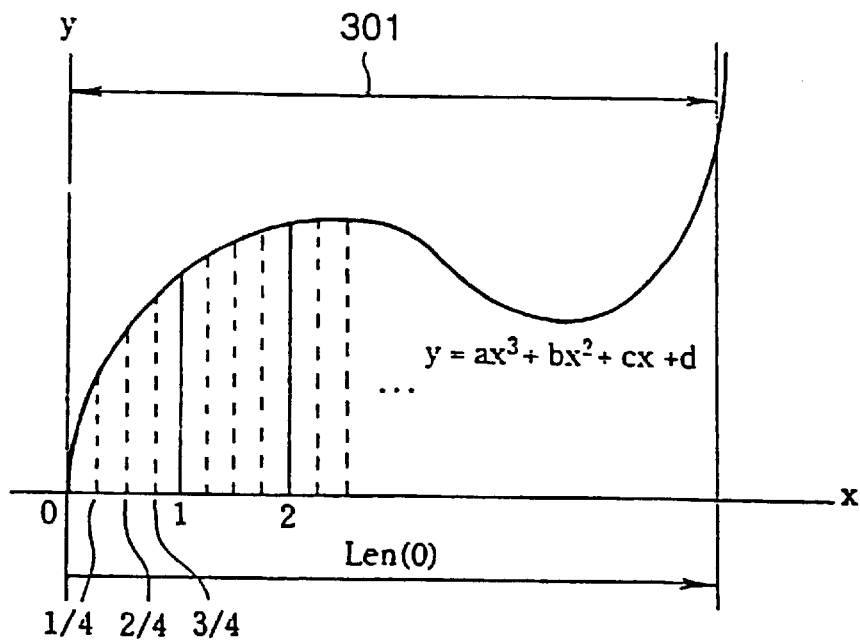
[FIG. 6]
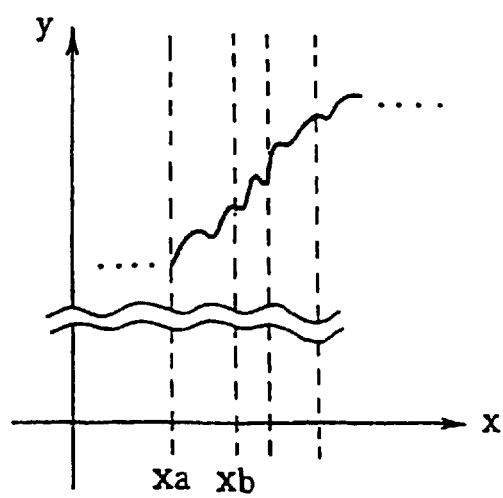

[FIG. 7]
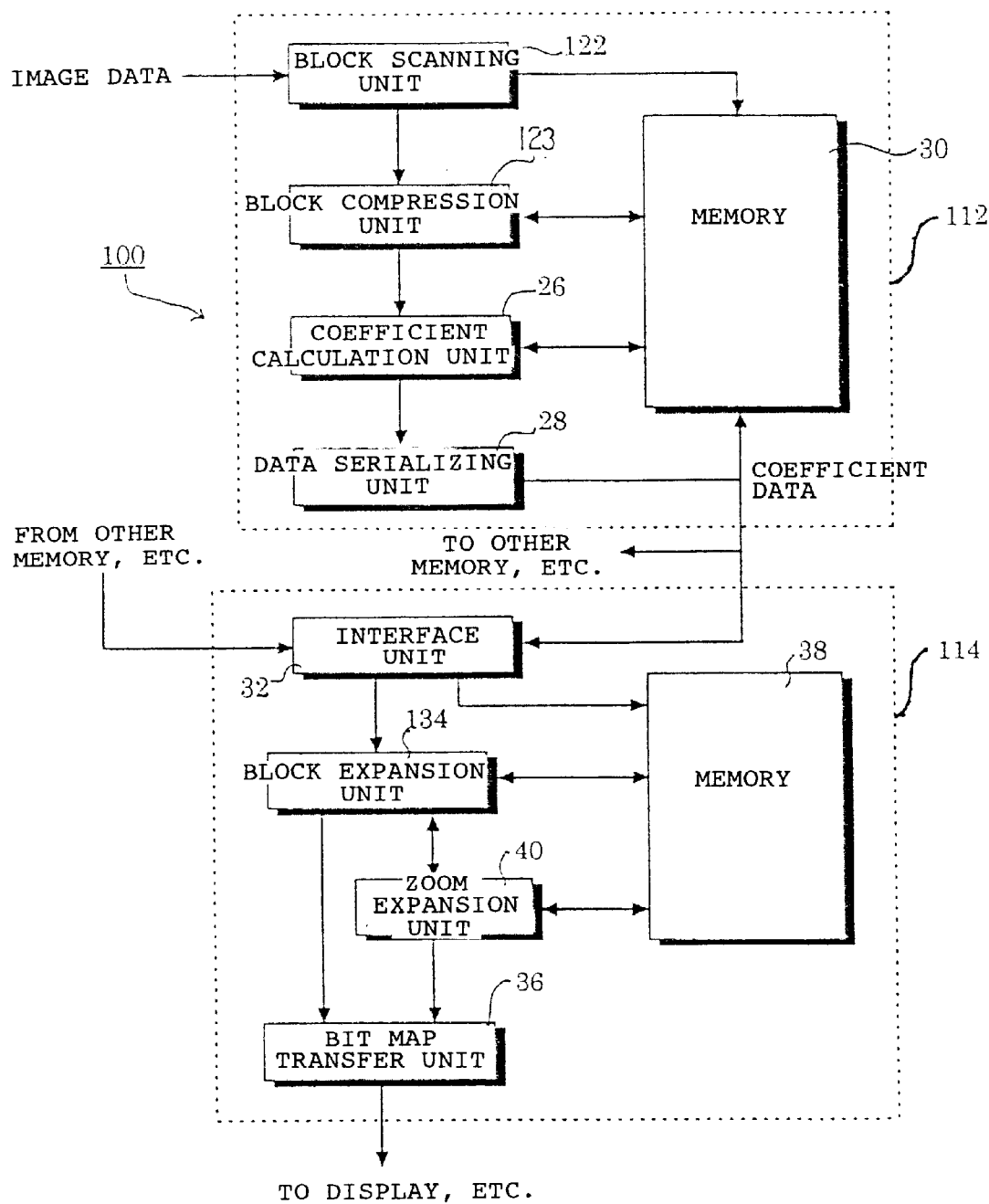

[FIG. 8]
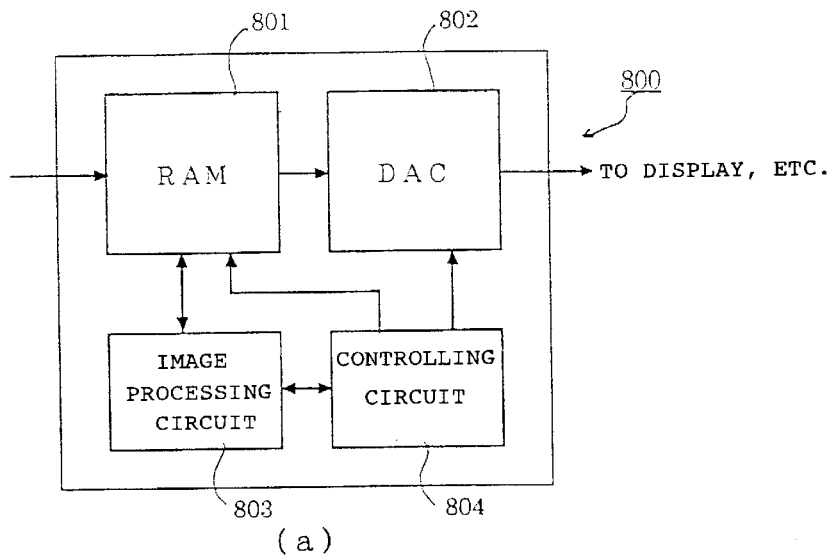
(a)
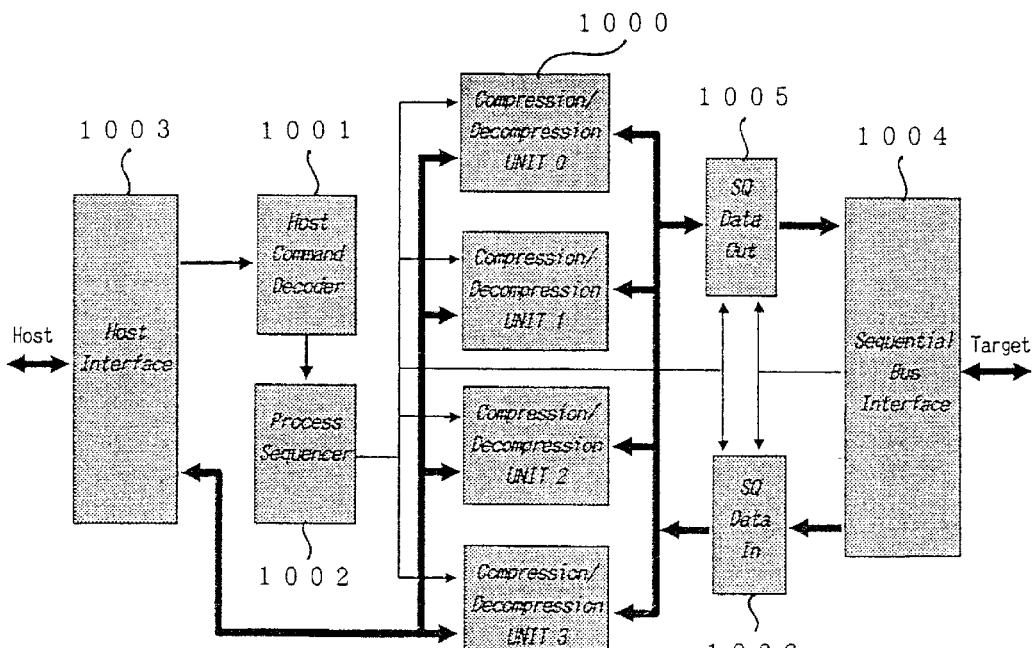
(b) OVERALL BLOCK VIEW

[FIG. 9]
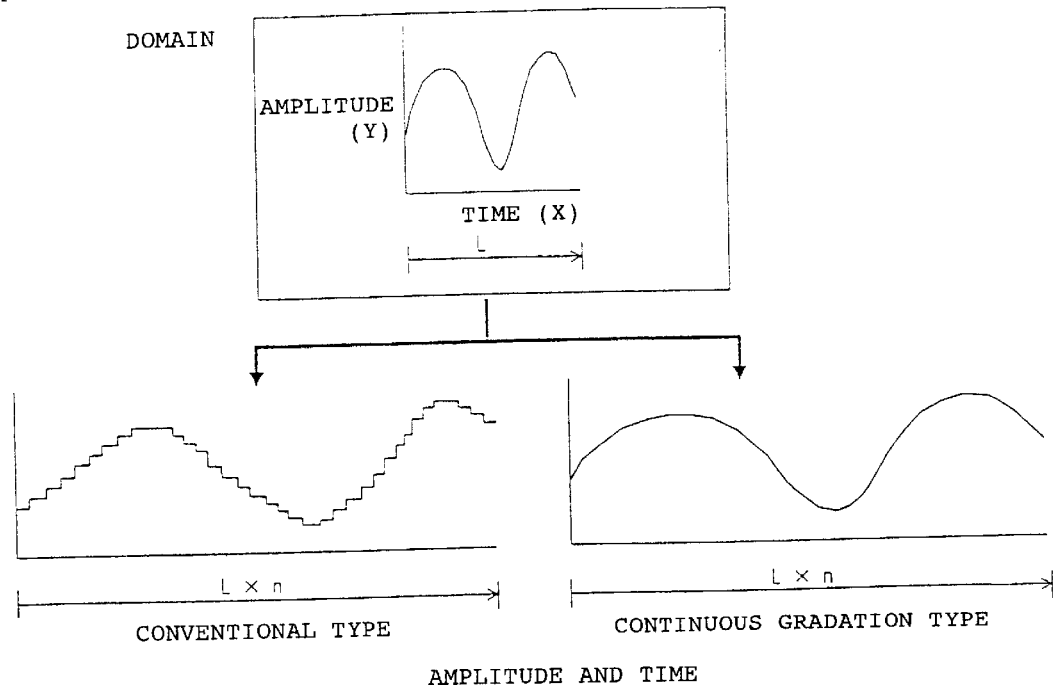
AMPLITUDE AND TIME
[FIG. 10]
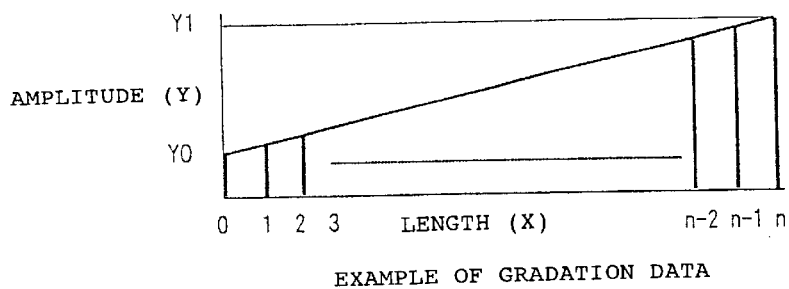
EXAMPLE OF GRADATION DATA
[FIG. 11]
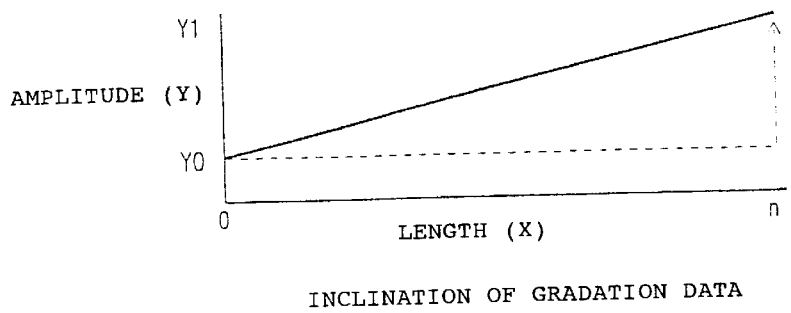
INCLINATION OF GRADATION DATA

[FIG. 12]
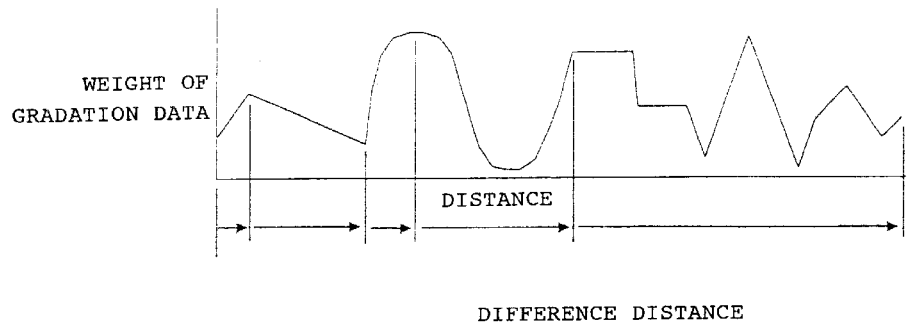
DIFFERENCE DISTANCE
[FIG. 13]
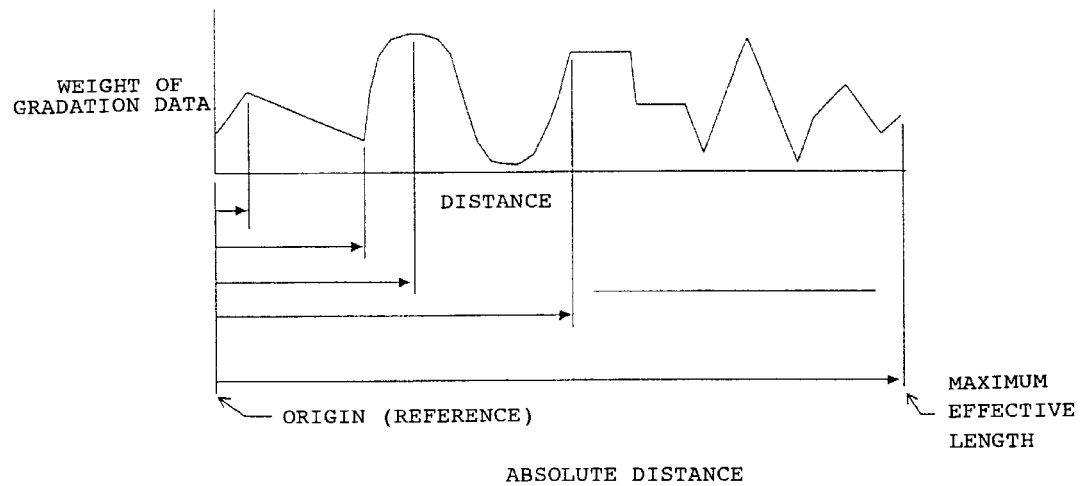
ABSOLUTE DISTANCE
[FIG. 14]
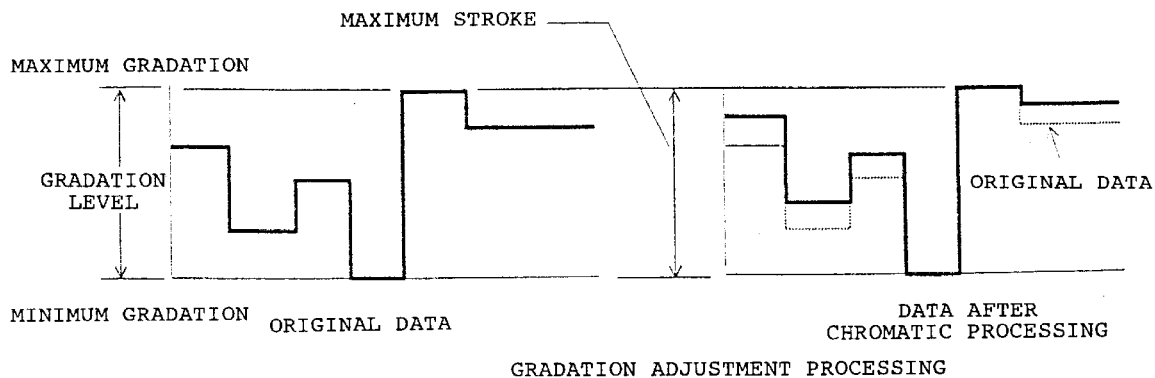
GRADATION ADJUSTMENT PROCESSING

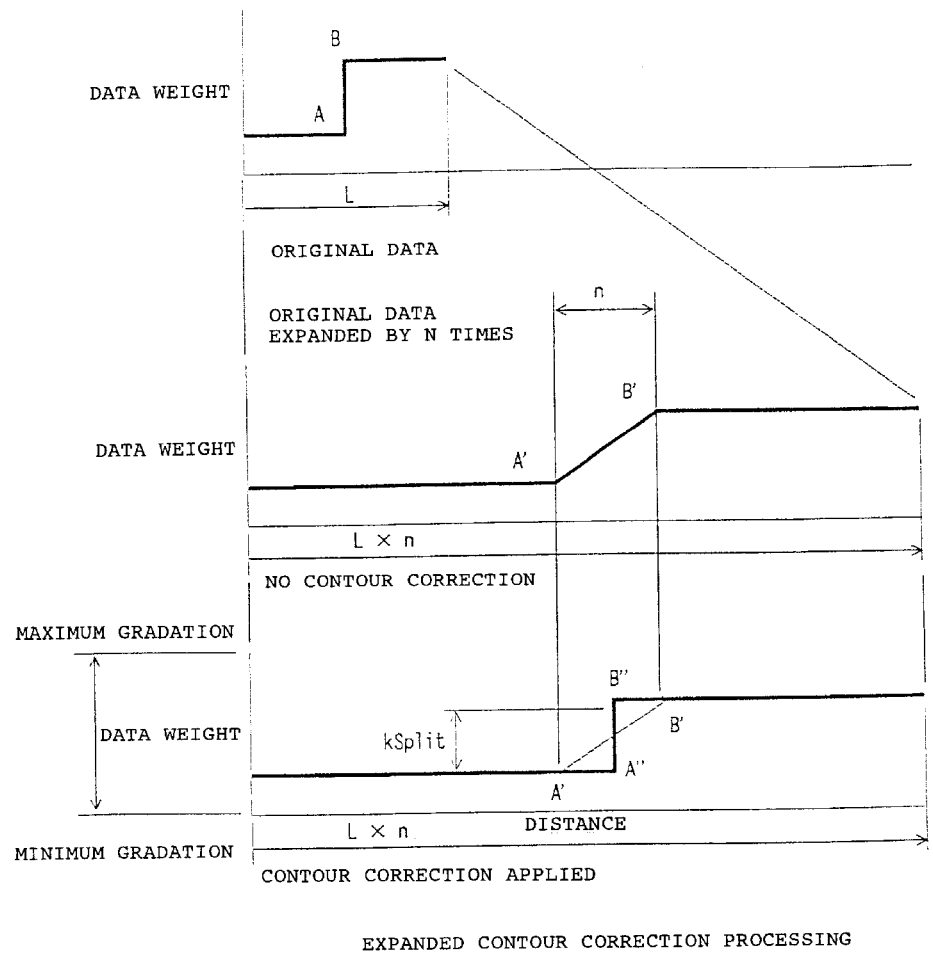
EXPANDED CONTOUR CORRECTION PROCESSING
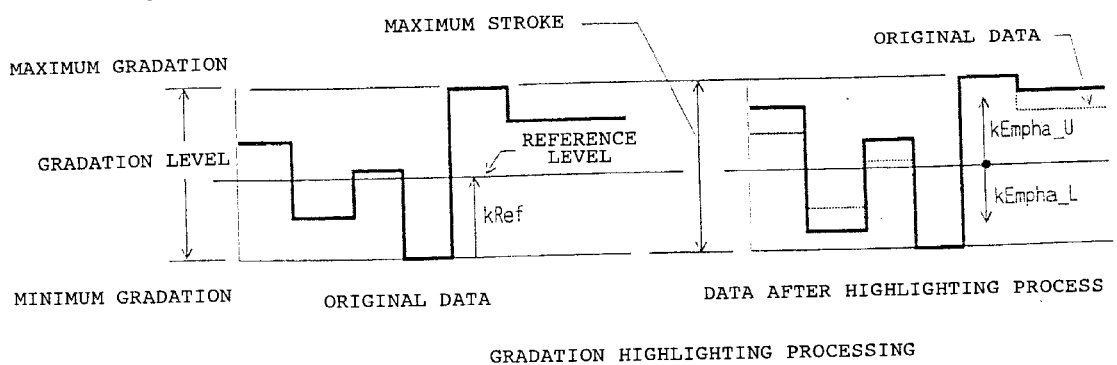
GRADATION HIGHLIGHTING PROCESSING

[FIG. 17]
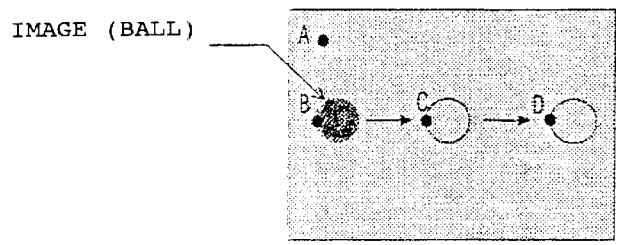
ACTUAL MOVEMENTS OF DYNAMIC IMAGE SCREEN
[FIG. 18]
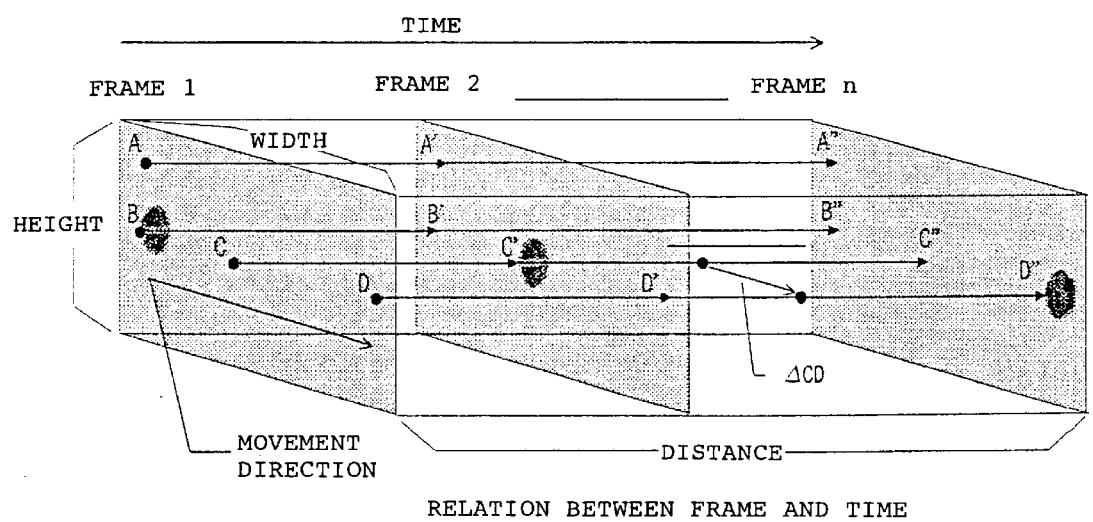
RELATION BETWEEN FRAME AND TIME

[FIG. 19]
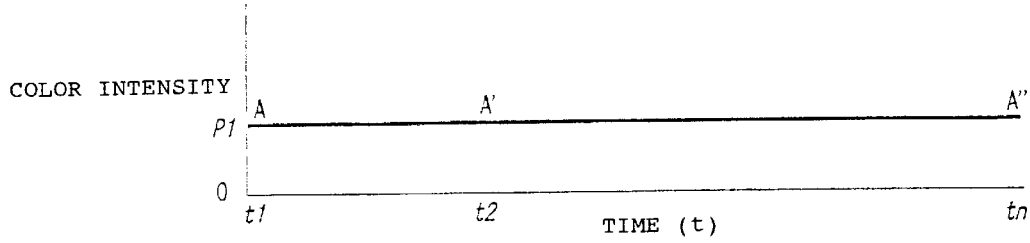
(a) CHANGES OF POINT A
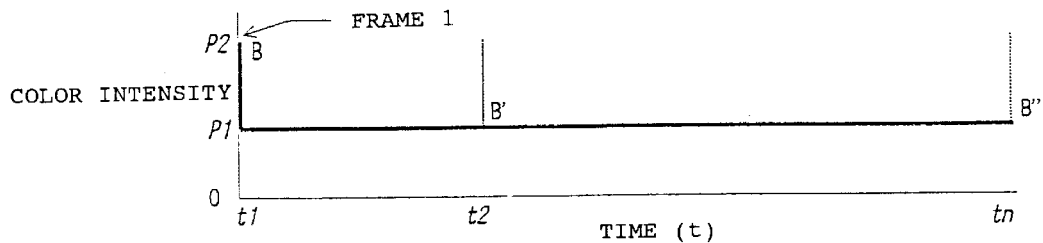
(b) CHANGES OF POINT B
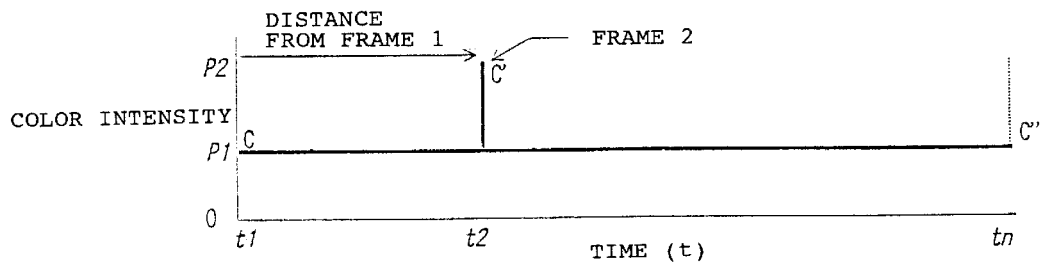
(c) CHANGES OF POINT C
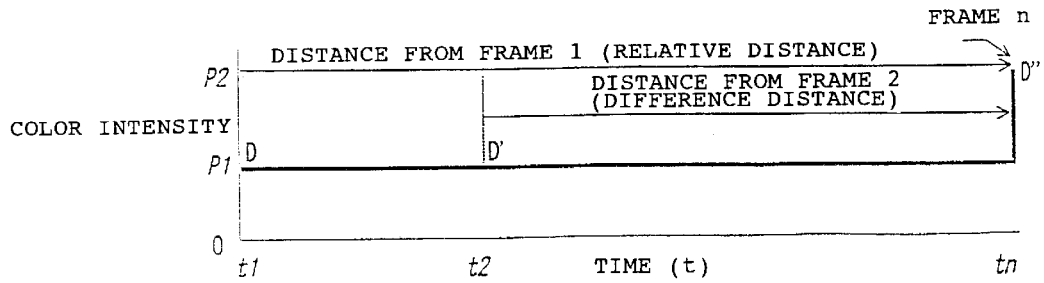
(d) CHANGES OF POINT D
RELATIVE RELATION BETWEEN
THE SAME POINT ON THE SCREEN AND FRAMES

[FIG. 20]
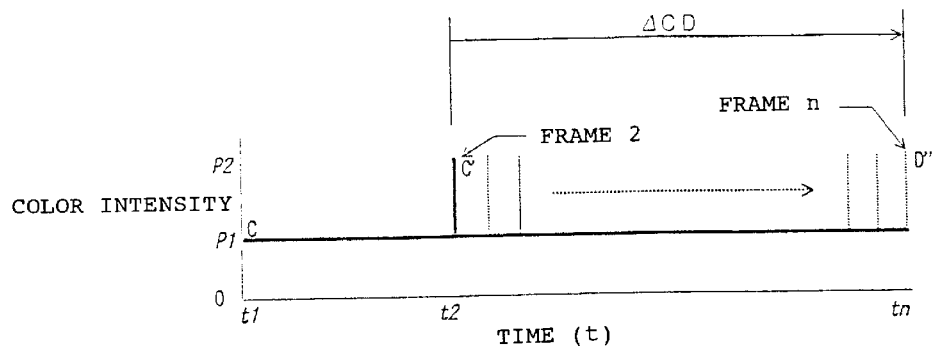
SCREEN DISPLAY AND MOVEMENT OF POINT
[FIG. 21]
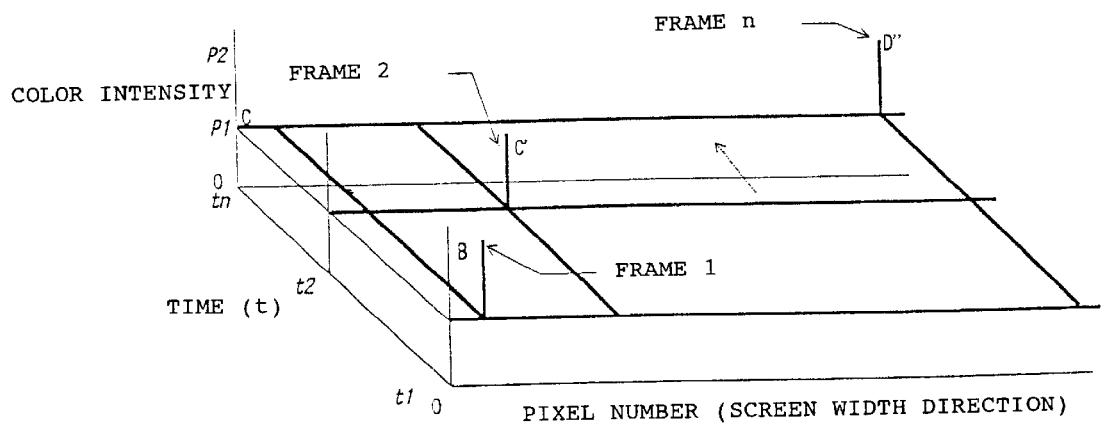
RELATIVE RELATION BETWEEN FRAMES (TIME, COLOR INTENSITY, PIXEL NUMBER)

[FIG. 22]
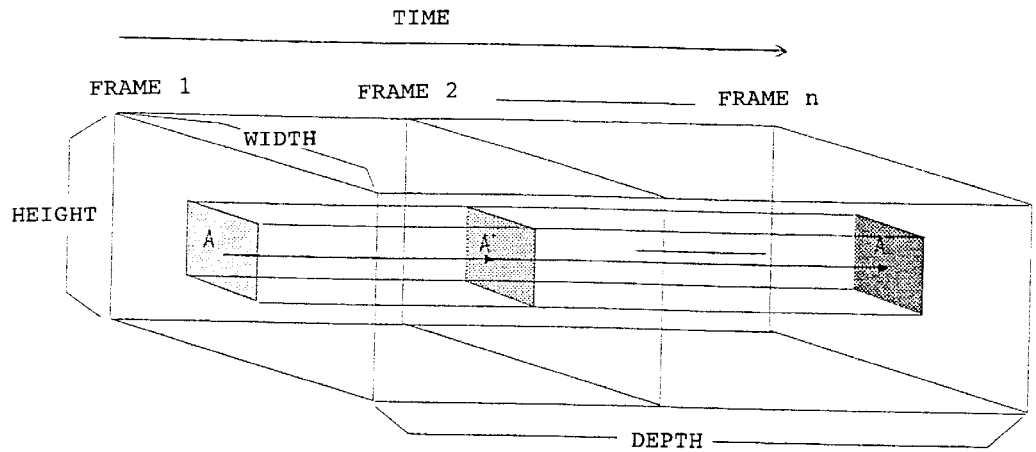
FRAME PREDICTION
[FIG. 23]
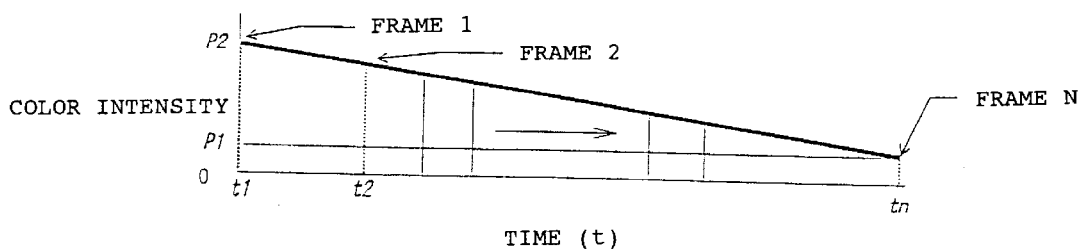
PREDICTION OF CHANGES BETWEEN FRAMES FOR AREA A
[FIG. 24]
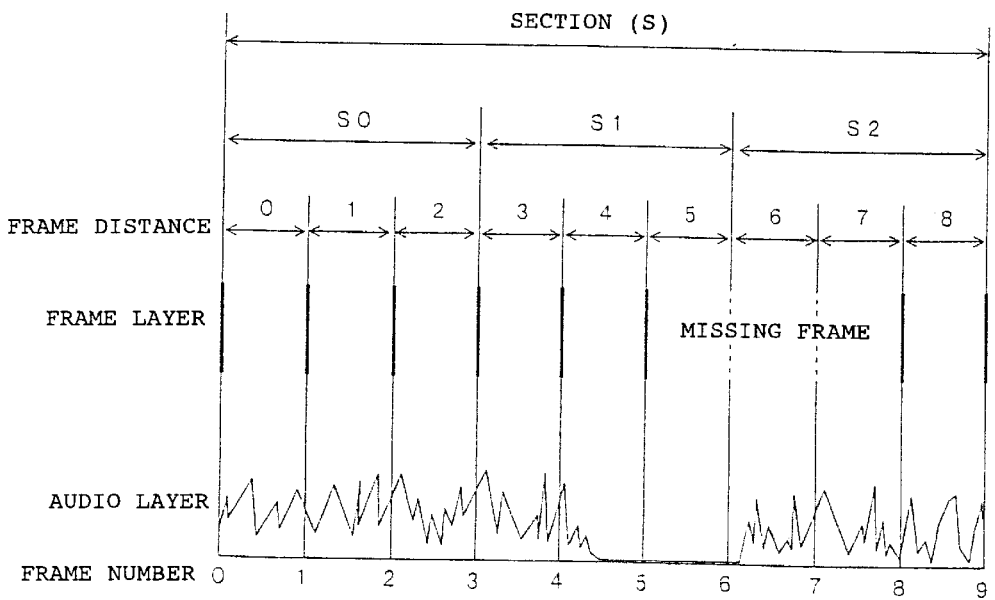
SYNCHRONIZATION OF FRAME AND SOUND

[FIG. 25]
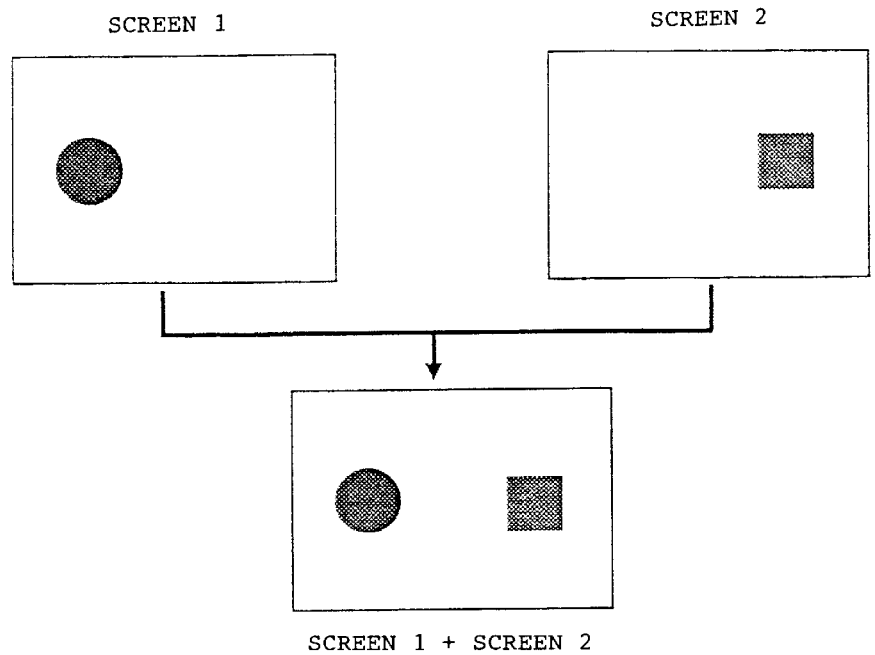
MULTI-SCREEN SYNTHESIS
[FIG. 26]
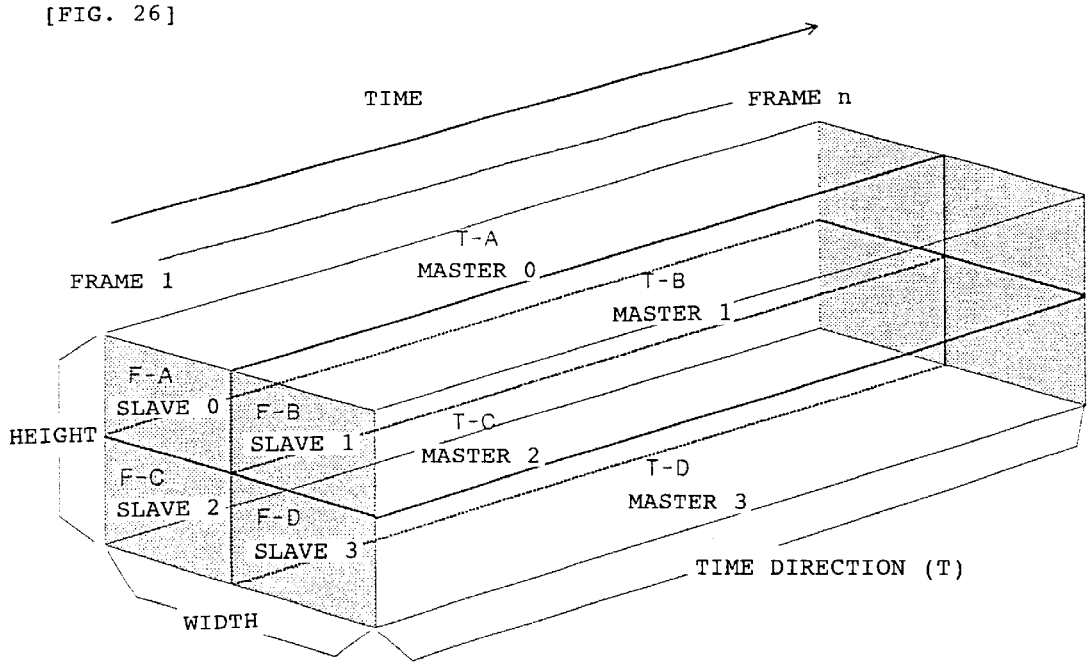
EXAMPLE OF PARALLEL PROCESSING BY MASTER AND SLAVE FUNCTIONS

[FIG. 27]
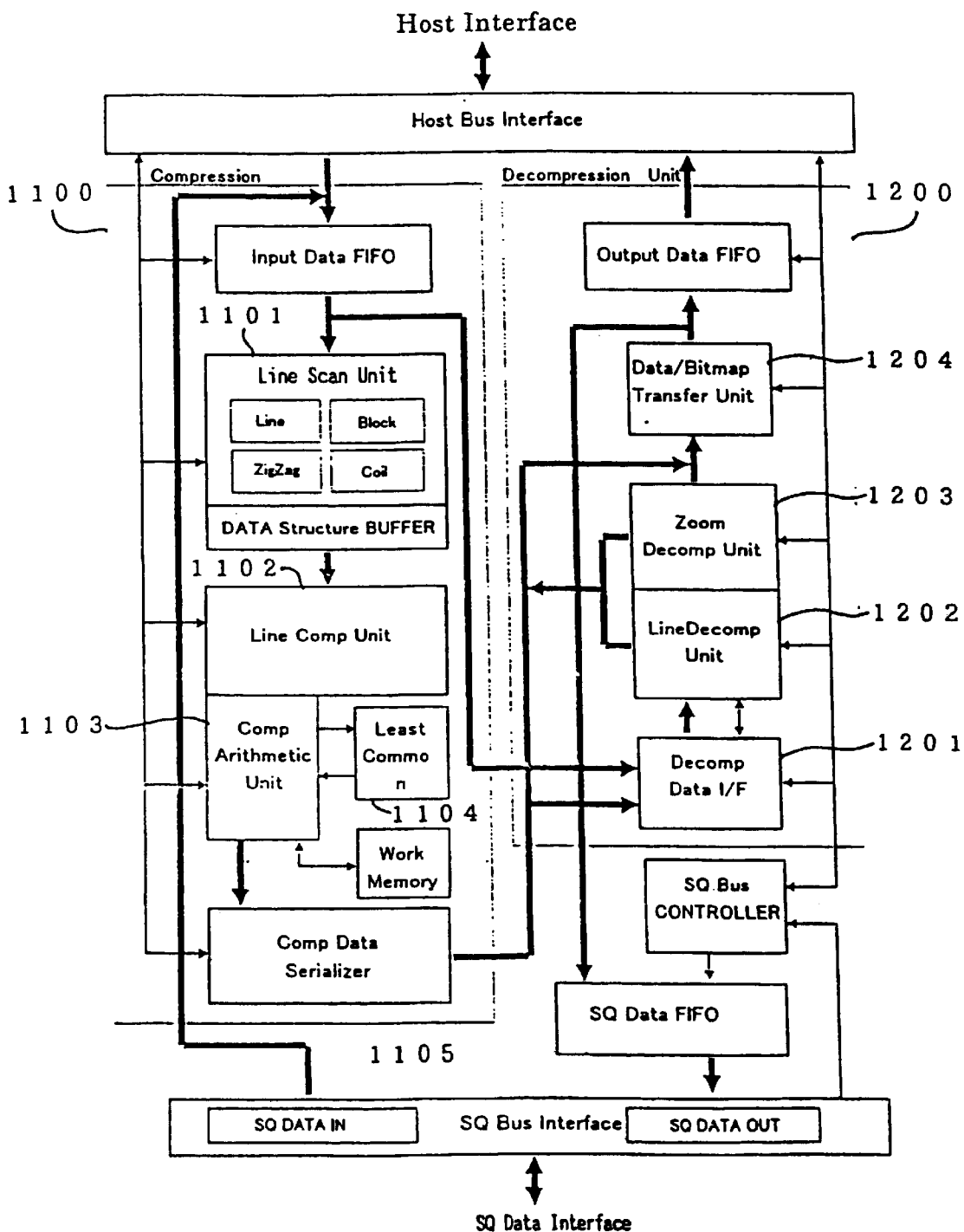

[FIG. 28]
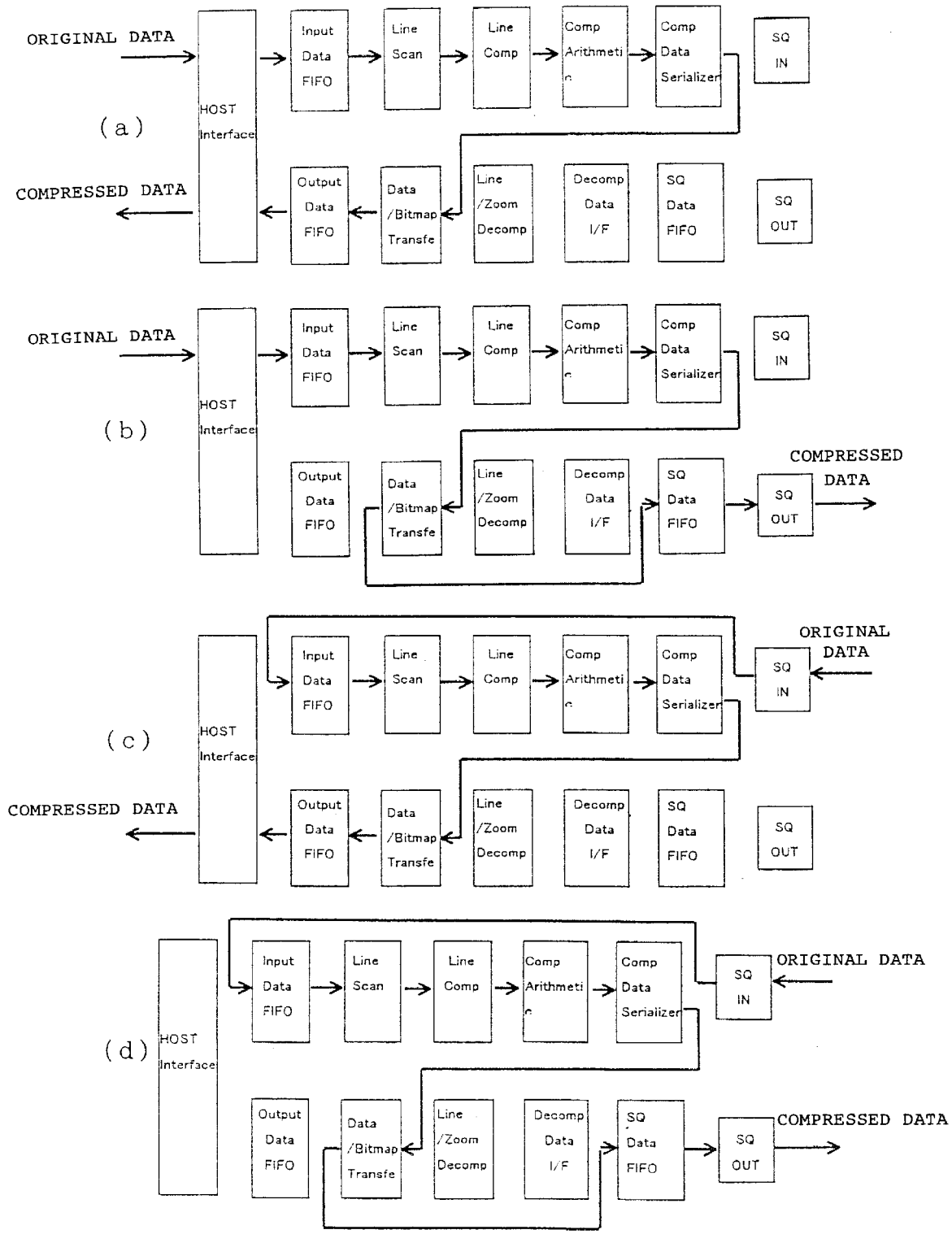

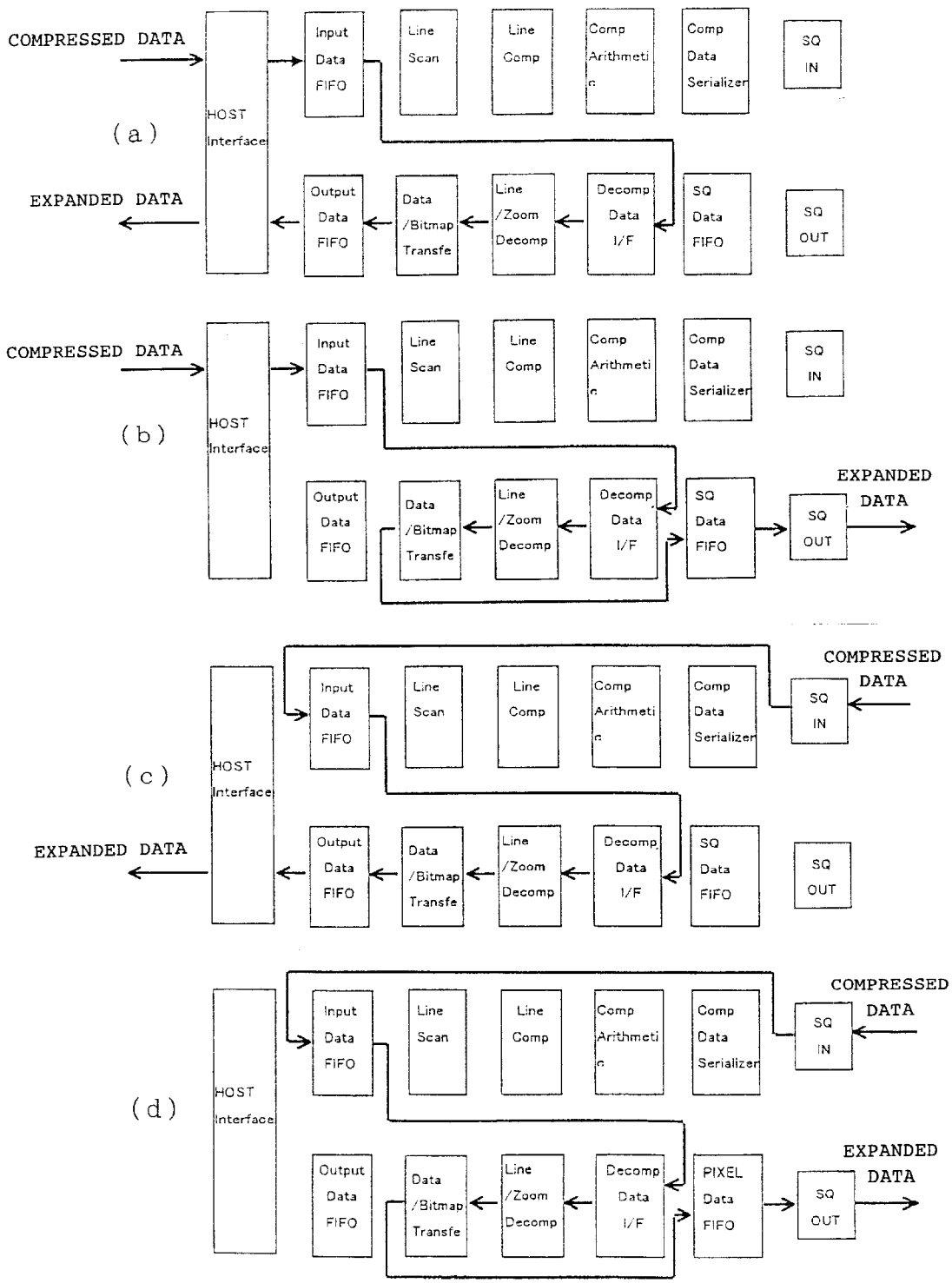
[FIG. 29]

[FIG. 30]
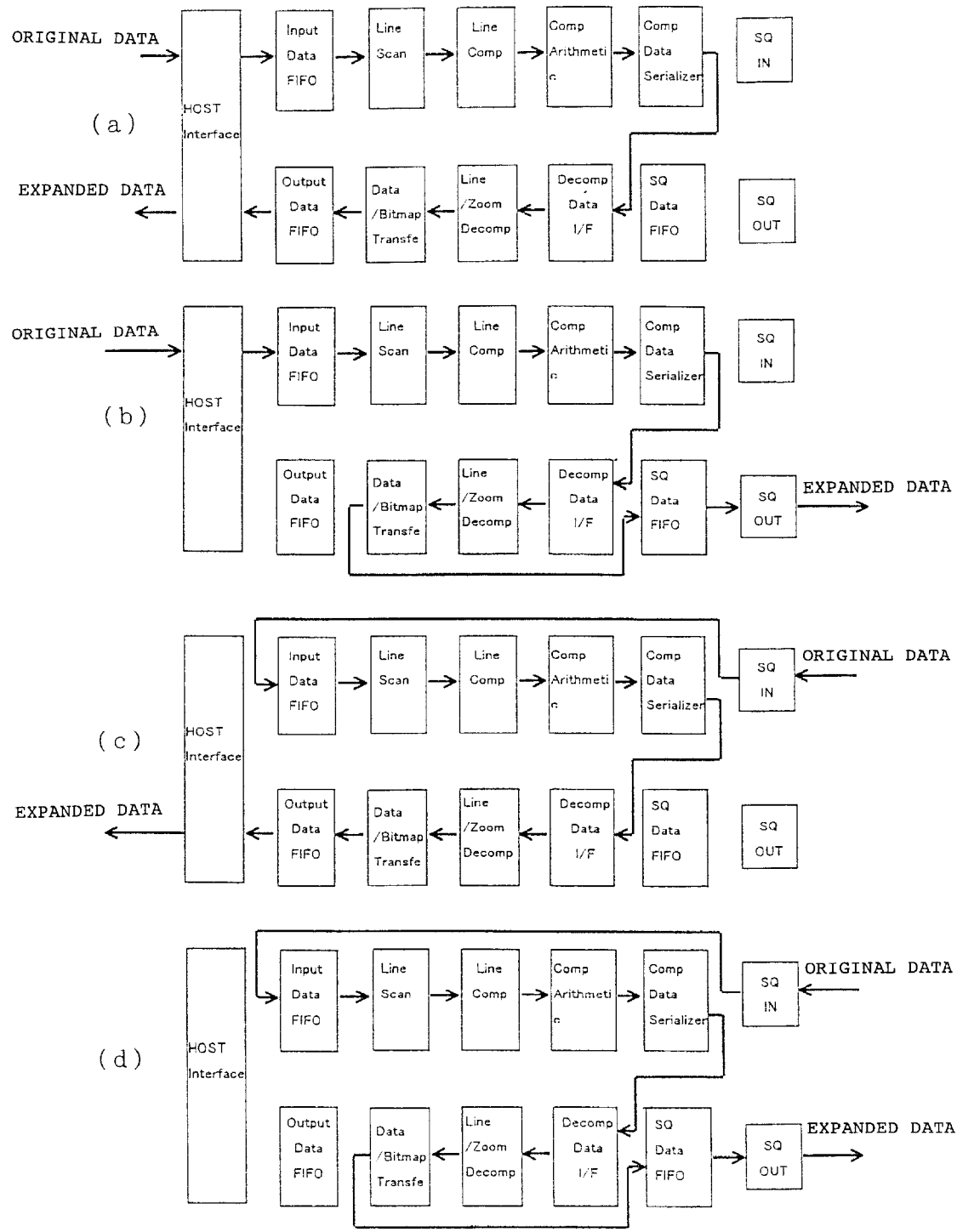

[FIG. 31]
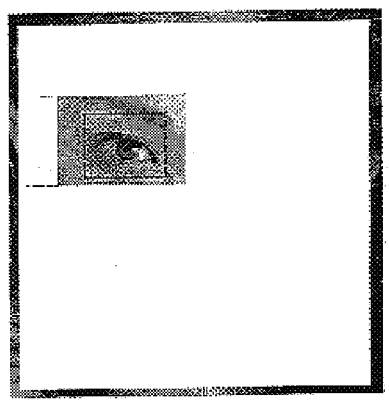
SQUARED PORTION IS EXPANDED BY 6 TIMES
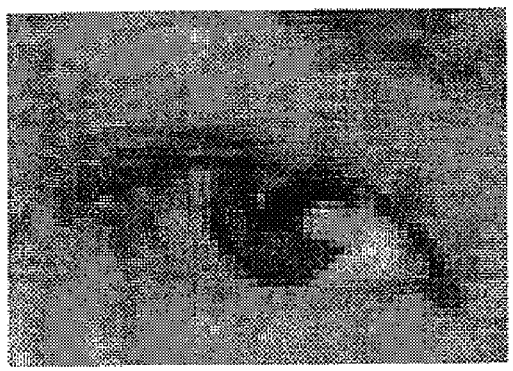
CONVENTIONAL ENLARGEMENT
FINE-DEFINITION ENLARGEMENT
(CONTINUOUS GRADATION)
FINE-DEFINITION CONVERSION EFFECTS

CONTINUOUS GRADATION COMPRESSION APPARATUS AND METHOD, CONTINUOUS GRADATION EXPANSION APPARATUS AND METHOD, DATA PROCESSING APPARATUS AND ELECTRON DEVICE, AND MEMORY MEDIUM STORING PROGRAMS FOR EXECUTING SAID METHODS

BACKGROUND OF THE INVENTION

The present invention relates to a continuous gradation compression apparatus and method, a continuous gradation expansion apparatus and method, and a data processing electron device and memory medium in which programs for executing the methods are stored, particularly to an image compression apparatus for converting/compressing image data.

Recent improvements in the performance of computers have enabled significant developments in the field of computer graphics technology, realizing images with abundant color and high resolution. The computer graphics technology is being increasingly applied to photograph processing and printing, and also to the field of games.

A known computer graphics technology is the bit map method. According to this method, an image is composed of many pixels. These pixels express color and brightness by holding brightness data for the three. primary light colors red (R), green (G) and blue (B). The more the volume of the RGB data (number of bits), the more detailed the expressed color and brightness, and the more the number of pixels, the finer the obtained image. Accordingly, a high quality image can be expressed by processing a very large amount of data. Recent improvements in the performance of microprocessors and an increased capacity of external memories such as semiconductor memories and hard discs have overcome this issue, providing computer graphics of a satisfactory level.

However, there were also demands for even higher quality images such as images with little roughness after enlargement, required for printing catalogues, etc. To meet such demands, there was a need to develop an algorism that efficiently utilizes the limited microprocessor performance and memory capacity. According to one such method, image data are efficiently compressed, and then expanded to express fine images.

Conventionally, it is known to convert and compress image data composed of color data for each pixel. As the volume of each pixel data is very large, this method is often used for storing such data or for transmitting such data via a network.

On the other hand, data compressed through various methods are expanded to restore the image in order to display such image on the screen of a display apparatus, but it is not guaranteed that the same image as the original will be restored.

If not the same image as the original is restored, it is often a rougher image than the original. Therefore, users were mostly unsatisfied with the quality of the restored image displayed on the display screen or printed via a printer. In fields where the image quality is particularly important, such as when printing catalogues, current computer graphics technologies did not reach the commercial level. In other words, it was required to compose images of more pixels and to increase the number of bits for the RGB data of each pixel.

Although it is well-known to display enlarged images on a display screen or print them by a printer, the enlargement rate was limited to whole numbers (e.g., 2, 4, or 8 times), and the obtained image tended to become rougher with larger enlargement rates. Therefore, it was required to compose images of more pixels and to increase the number of bits for the RGB data of one pixel.

However, there were constraints from the aspect of hardware performance. Therefore, an algorism was required that effectively utilizes the limited hardware performance to obtain effects similar to those aimed above.

An object of the present invention is to provide an image processing apparatus that offers good images after compression and expansion.

A further object of the present invention is to provide an image processing apparatus that can enlarge images as desired and offers good images after enlargement.

DISCLOSURE OF THE INVENTION

The continuous gradation compression apparatus according to the present invention comprises:

data division means which divides a plurality of data constituting image or acoustic data into groups of predetermined ranges;

formula calculation means which expresses each of the divided plurality of groups in relation with a data value corresponding to a position within the predetermined range as a polynomial equation having said position as the variable; and coefficient calculation means which calculates the coefficients to be assigned to each variable of said polynomial equation, wherein the coefficient data obtained by said coefficient calculation means for each of the divided plurality of groups is output as compressed data within said predetermined range.

According to the present invention, corresponding data are expressed as a polynomial equation of a position within a predetermined range, so data can be expressed in an adequate manner. Compressed data need only show a certain range and coefficients, so it is possible to improve the data compression efficiency.

In the continuous gradation compression apparatus according to the present invention, the formula calculation means obtains at least the maximum value and/or the minimum value of the data value. For example, when solving a second formula $y'=3ax^2+2bx+c$, which is the differential function of a first formula $y=ax^3+bx^2+cx+d$, it is possible to set $y'=0$ for the maximum and/or minimum value, so it is possible to easily obtain the coefficients. Furthermore, through this process, only at least three (x, y) pairs need to be detected, so it is possible to make this processing simple and high-speed.

The continuous gradation expansion apparatus according to the present invention that receives the coefficient data from any one of the continuous gradation compression apparatuses above and restores the image or acoustics based on the data, comprises:

polynomial equation calculation means which inserts said coefficient in a predetermined polynomial equation; and expansion means which calculates the data value corresponding to the position based on the polynomial equation calculated by said polynomial equation calculation means, wherein said data value obtained by said expansion means is output as image or acoustic data.

The continuous gradation expansion apparatus according to the present invention further comprises:

scale factor fixing means; and interpolation means which calculates said position based on said scale factor, and, based on the polynomial equation calculated by said polynomial equation calculation means, calculates the data value corresponding to the position calculated based on said scale factor, and thereby calculates positional data that is different from the original data. Thereby, it is possible to interpolate the data value corresponding to the position between the original positions in an adequate manner, so the image quality or sound quality is not deteriorated in obtaining enlarged images or acoustics.

The data processing apparatus according to the present invention is constituted of any of the continuous gradation compression apparatuses above and any of the continuous gradation expansion apparatuses above.

The continuous gradation compression method according to the present invention comprises the steps of:

dividing a plurality of data constituting image or acoustic data into groups of predetermined ranges;

expressing each of the divided plurality of groups in relation with a data value corresponding to a position within the predetermined range as a polynomial equation having said position as the variable;

calculating the coefficients to be assigned to each variable of said polynomial equation; and outputting the coefficient data obtained at said coefficient calculation step for each of the divided plurality of groups as compressed data within said predetermined range.

The continuous gradation expansion method according to the present invention that receives the coefficient data obtained by the continuous gradation compression method above and restores the image or acoustics based on the data comprises the steps of:

inserting said coefficient in a predetermined polynomial equation;

calculating the data value corresponding to the position based on the polynomial equation calculated at said polynomial equation calculation step; and outputting said data value obtained by said expansion means as image or acoustic data.

The data processing electron device according to the present invention comprises:

a processing unit which performs compression processing and expansion processing of input image or acoustics data;

a memory for storing compressed data;

a digital-to-analog converter which converts expanded data into analog signals; and a controlling unit which controls said processing unit, wherein said processing unit comprises:

data division means which divides a plurality of data constituting image or acoustic data into groups of predetermined ranges;

formula calculation means which expresses each of the divided plurality of groups in relation with a data value corresponding to a position within the predetermined range as a polynomial equation having said position as the variable;

coefficient calculation means which calculates the coefficients to be assigned to each variable of said polynomial equation, compressed data output means which outputs the coefficient data obtained by said coefficient calculation means for each of the divided plurality of groups as compressed data within said predetermined range polynomial equation calculation means which inserts said coefficient in a predetermined polynomial equation;

expansion means which calculates the data value corresponding to the position based on the polynomial equation calculated by said polynomial equation calculation means; and expanded data output means which outputs said data value obtain by said expansion means as image or acoustic data.

The memory medium storing a program according to the present invention comprises the steps of:

dividing a plurality of data constituting image or acoustic data into groups of predetermined ranges;

expressing each of the divided plurality of groups in relation with a data value corresponding to a position within the predetermined range as a polynomial equation having said position as the variable;

calculating the coefficients to be assigned to each variable of said polynomial equation; and outputting the coefficient data obtained at said coefficient calculation step for each of the divided plurality of groups as compressed data within said predetermined range.

The memory medium storing a program according to the present invention comprises the steps of:

inserting said coefficient in a predetermined polynomial equation;

calculating the data value corresponding to the position based on the polynomial equation calculated at said polynomial equation calculation step; and outputting said data value obtain by said expansion means as image or acoustic data.

The media may be, for example, a floppy disc, hard disc, magnetic tape, magneto-optic disc, CD-ROM, DVD, ROM cartridge, RAM memory cartridge with battery backup, flash memory cartridge, non-volatile RAM cartridge. Also included are telephone lines and other cable communications media, and microwave circuits and other wireless communications media. The Internet is included in the communications media. Media is defined as any kind of physical means for storing information (mainly digital data, programs), used to causing computers, dedicated processors and other processing apparatuses to perform certain functions. In other words, this may be any means for downloading programs onto a computer and for causing the computer to implement certain functions.

BRIEF DESCRIPTION OF THE DRAWINGS

FIG. 1 is a block diagram showing the structure of the image processing apparatus according to a first embodiment of the present invention;

FIG. 2 is a flow chart showing the process implemented by a compression circuit according to the first embodiment in outline;

FIG. 3 is a graph showing an example of a set of coordinates specified for each interval of one line;

FIG. 4 is a flow chart showing the process implemented by an expansion circuit according to the first embodiment in outline;

FIG. 5 is a drawing explaining the operations of a zoom expansion unit in the zoom expansion circuit according to the first embodiment;

FIG. 6 is a schematic expanded view of the graph in FIG. 3;

FIG. 7 is a block diagram showing the structure of the image processing apparatus according to a second embodiment of the present invention;

FIG. 8(a) is a block diagram showing the structure of the present invention as applied to a RAMDAC;

FIG. 8(b) is a block diagram showing the structure of the apparatus according to an embodiment of the present invention;

FIG. 9 is an explanatory view of the operation principles of continuous gradation processing according to the present invention;

FIG. 10 shows an example of the gradation data;

FIG. 11 shows an example of the inclination line of the gradation data;

FIG. 12 is an explanatory view of the difference length;

FIG. 13 is an explanatory view of the absolute length;

FIG. 14 is an explanatory view of the gradation adjustment processing;

FIG. 15 is an explanatory view of the expanded contour correction processing;

FIG. 16 is an explanatory view of the gradation highlighting processing;

FIG. 17 is an explanatory view of the actual movements of the dynamic image screen;

FIG. 18 is an explanatory view of the relationship between each frame and time;

FIG. 19 is an explanatory view of the relative relationship between same points on the screen and each frame;

FIG. 20 is an explanatory view of the screen display and the movement of a point;

FIG. 21 is an explanatory view of the relative relationship between each of the frames;

FIG. 22 is an explanatory view of the frame prediction;

FIG. 23 is an explanatory view of the inter-frame change prediction in area A as shown in FIG. 22;

FIG. 24 is an explanatory view of sound synchronization with frames;

FIG. 25 is an explanatory view of synthesizing multiple screens;

FIG. 26 shows an example of the parallel processing of processes realized through the master and slave functions;

FIG. 27 is a functional block view of the main units; and

FIGS. 2–30 are explanatory views of continuous gradation conversion operation.

In FIGS. 28–30, (a) shows the host-in-out operation mode, (b) shows the host-in-SQ(Sequence)-out operation mode, (c) shows the SQ-in-host-out operation mode, and (d) shows the SQ-in-SQ-out operation mode.

FIG. 31 is a comparative example of an image to which an embodiment of the present invention was applied and a conventional image.

BEST MODE FOR WORKING THE INVENTION

Now, the principles of continuous gradation processing will be explained and thereafter, concrete examples will be given. Furthermore, other related functions as well as the hardware structure will be explained. An apparatus embodying the present invention will also be referred to.

Embodiment 1
Explanation of Operation Principles

Continuous gradation processing is carried out by continuous gradation conversion, where continuous interpolation is conducted by formularizing the relationship between the signal time and amplitude, and compression conversion, where enlargement processing can be freely conducted by applying a formula to a gray scale.

First, the continuous gradation conversion will be explained. FIG. 9 shows the relationship between the gradation data amplitude and time. The X-axis shows the change in time, and the Y-axis shows the change in amplitude, forming one related area as a domain, and the length of time (x) is denoted by L. If length (L) changes at any one value (n), it is necessary to interpolate the value of amplitude (Y) at each time point in order to maintain the relationship between amplitude (Y) and time (X). According to conventional methods, it was common during digital signal processing to interpolate the value of amplitude (Y) by the amount of value n of change in the length (L). However, this method resulted in a stepped waveform as shown in the lower left graph in FIG. 9, and could not faithfully reproduce images having gradation data structure. When synchronizing dynamic images with audio data, interpolation of same values occurred during replay of the audio data, resulting in portions with no sound. In contrast, the continuous gradation function according to the present invention allows maintenance of the relationship between time and amplitude without being directly affected by changes in length (L) by formularizing the relationship between time (X) and amplitude (Y), as shown in FIG. 9, lower right graph. Linear, cubic, or other functions may be utilized for this process.

Now, the compression conversion will be explained. In this process, points of change in the gradation data are detected and converted to the function corresponding to the detected coordinates. The basic principle is described below by using the data of a general image bit map having gradation data structure as an example. FIG. 10 shows the gray scale from amplitude (Y0) as the initial value to amplitude (Y1). From the bit map data, it is possible to conceive length (X) as the address of each pixel, and amplitude (Y) as the color weight. As shown in the drawing, there are (n+1) color weights (amplitudes) corresponding to each pixel address (length).

This process functions to largely reduce the data volume by, for example, allocating a linear function to the gray scale gradation. When using a linear function, the function applying to coordinates (0, Y0) and (n, Y1) in the drawing is as follows.

$$\text{Amplitude } (Y) = ((Y1-Y0)/n) \times \text{length } (X) + Y0 (0 \times n)$$

The coefficient in the above function denotes the inclination of the function. This relation is shown in FIG. 11.

In other words, this process only requires the determination of the inclination from the amplitude and the length. As result, amplitude (Y) for the interval between length (0) and length (n) can be calculated by assigning these lengths to length variable (X) and solving the equation without requiring any actual intermediate data. Even if value n in the function is changed to an arbitrary value, it is possible to find the value of amplitude (Y), allowing free expansion of the gradation data (e.g., enlargement processing). It is possible to apply continuous gradation to the process of enlarging pictures with very fine definition.

Now, the embodiments of the present invention will be described by referring to the attached drawings.

FIG. 1 is a block diagram showing the structure of the image processing apparatus according to an embodiment of the present invention. As shown in FIG. 1, image processing apparatus 10 comprises a compression circuit 12 for receiving and compressing image data composed of color data for the three primary colors (RGB) for each pixel, and an expansion circuit for receiving and expanding data relating to a compressed image (coefficient data) to restore the image data.

Compression circuit 12 comprises a line scanning unit 22 for receiving image data, dividing the image data in groups of predetermined numbers of pixels, inspecting the values of the color data (color data values) for each section, and obtaining the maximum and minimum values, a line compression unit 24 for gaining the necessary equation based on the maximum and minimum values for each group, a coefficient calculation unit 26 for calculating the coefficients of the gained equation, a data serialization unit 28 for serializing the calculated coefficients and various other data to output them to an external electron device, and a memory 30 for storing the coefficient data gained at coefficient calculation unit 26 and other necessary data and a program to operate compression circuit 12.

Expansion circuit 14 comprises an interface unit 32 for receiving data from an external electron device, etc., a line expansion unit 34 for solving the expansion formula based on the coefficient data from interface unit 32, a bit map transfer unit 36 for restoring image data in a format that can be output to a display apparatus or the like (not illustrated), a memory 38 for storing the restored image data and other necessary data and a program to operate expansion circuit 12, and a zoom expansion unit 40 for implementing the zoom-up process for the image data as described below. The image data output from bit map transfer unit 36 is given to a display apparatus (not illustrated), and the corresponding image is displayed on its screen.

In FIG. 1, the coefficient data obtained from compression circuit 12 is stored in memory 30, and may also be stored in a portable memory medium such as a floppy disc or optical disc, or in a fixed memory unit such as a hard disc. The coefficient data may also be given to another expansion circuit 14 via a network, such as the Internet. Expansion circuit 14 is able to receive the coefficient data obtained from compression circuit 12 via a network as described above, and also by reading the coefficient data stored in a portable memory medium.

Compression circuit 12 and expansion circuit 14 may each be realized through a personal computer. It is possible to provide either compression circuit 12 or expansion circuit 14, or both of them on a personal computer. The programs for operating compression circuit 12 or expansion circuit 14 may be stored in a portable memory medium such as a CD-ROM or floppy disc, or on a hard disc.

The operations of compression circuit 12 and expansion circuit 14 of image processing apparatus 10 according to the embodiment structured as above will be described below. Compression circuit 12 and expansion circuit 14 according to the present embodiment can be operated under a first mode (also referred to herein as "point pixel mode") for deriving a certain simultaneous equation by calculating the minimum and maximum values at a point of change, or a second mode (also referred to herein as "full pixel mode") for deriving a certain simultaneous equation to acquire more detailed data. Under the first mode, the compression rate is high, and under this mode, it is possible to acquire good images with no deterioration of image quality for image data including obtusely curved line portions (e.g., gradations). On the other hand, under the second mode, the resulting data size may be larger than the original image data size, but it is possible to gain excellent quality images.

According to the present embodiment, the pixel data is used to calculate the basic cubic equation $y=ax^3+bx^2+cx+d$, expressing the image data using this basic cubic equation. Here, a cubic equation is used because it is a linear function which is relatively easy to process, and there are relatively few errors at approximation. Under the first mode, coefficients a through c are determined from $(y'=)f(x)=3ax^2+2bx+c$, the basic tangent function gained by differentiating the basic cubic equation, and then, based thereon, the final basic cubic equation $y=ax^3+bx^2+cx+d$ is used to calculate coefficients a through d. Under the second mode, coefficients a and d are determined from the basic cubic equation $y=ax^3+bx^2+cx+d$, the equation showing the cubic function for the pixel position (x-coordinate) and the corresponding color depth value (y-coordinate).

1.1 Operations in First Mode (Point Pixel Mode)

This mode has a high compression rate. There is no deterioration in image data that contain obtusely curved line portions (gradations, etc.) and it is possible to reproduce clear images that do not become rough when enlarged.

FIG. 2 is a flow chart showing the process implemented by a compression circuit according to the present embodiment in outline. First, the operations of compression circuit 12 under the first mode will be described.

<Step 201>

In compression circuit 12, line scanning unit 22 extracts the color data group (R data, G data, B data) relating to the pixels for one line of the image data. One of the end points of the pixels for one line (e.g., the left endpoint) is set to x=0, so that the position of each pixel within one line can be expressed as an x-coordinate.

For example, if the image is composed of 640 pixels in the horizontal (lateral) direction and 480 pixels in the perpendicular (vertical) direction, then, in a normal raster scanning method, one horizontal line is composed of 640 pixels, namely 640 data. The RGB expression may be, for example, as follows.

$$y_R(x): y_R(0), y_R(1), y_R(2), \ldots, y_R(639)$$

$$y_G(x): y_G(0), y_G(1), y_G(2), \ldots, y_G(639)$$

$$y_B(x): y_B(0), y_B(1), y_B(2), \ldots, y_B(639)$$

Line scanning unit 22 extracts the above data. The RGB elements of the color data group may each be handled independently. In other words, the processing described below is carried out for each of the RGB elements. In this way, as the processing for RGB, respectively, is the same, the pixel data are referred to simply as y below without specifying whether R, G, or B.

The explanation above related to one horizontal line, but naturally, the same processing can be applied to one perpendicular line.

<Step 202>

Next, line scanning unit 22 compares each of the pixel data values with its neighboring value in the horizontal direction, calculates the extreme values in one line and the corresponding x-coordinates, thereby analyzing one line.

In detail, assuming that the first coordinate in a certain interval is (n, Pixel(n)) (in the example above, n=0, 1, 2, . . . , 639), pixel(n) is inserted in the first register (a_Prev), and the color data value pixel(n+1) corresponding to the neighboring pixel is inserted in the second register (a_Now). The two register values are then compared with each other. If the values are equivalent or the difference between them is within a certain range (this value is determined by considering the quantizing error arising from the conversion into digital data and the noise level contained in the image, etc.), then the register value is not renewed. However, if a_Prev>a_Now, then the minimum value is renewed, and if a_Prev<a_Now, the maximum value is renewed.

Maximum and minimum values are respectively values that have relatively larger and smaller values before and after them, so it is possible when performing the successive comparison above to analyze the values before and after them to easily determine whether they are extreme values.

In this way, the maximum and minimum values for one line are gained. In one line, there may be a plurality of maximum and minimum values. The coordinates thereof may be expressed in the following way.

Minimum value coordinates: $(x_{min1}, y_{min1}), (x_{min2}, y_{min2})$

Maximum value coordinates: $(x_{max1}, y_{max1}), (x_{max2}, y_{max2})$

<Step 203>

Line scanning unit 22 divides one line into a plurality of intervals including each one maximum and one minimum value. This is to permit approximation to cubic functions. If one line does not include two or more minimum values and does not include two or more maximum values, then the whole line is approximated to a cubic function, and is not divided into intervals.

Division into intervals is performed to include one minimum value and one maximum value, respectively. The endpoints of an interval (starting and ending points) are set between neighboring extreme values (e.g., midpoint between extreme values). However, the starting point of the line (x=0 in the example above) is the starting point of the first interval, and the ending point of the line (x=639 in the example above) is the ending point of the last interval.

<Step 204>

The intervals divided above include four points, namely the starting and ending points and the maximum and minimum points. Line scanning unit 22 prepares the data for these four points for each interval. Assuming that the end points of intervals are x=0, $x_{Len0}$, $x_{Len1}$, $x_{Len2}$, . . . , and as one maximum value and one minimum value is included in each interval, the coordinates of the extreme values and endpoints included in each interval are as follows:

Interval 1: $(0, y_0), (x_{min1}, y_{min1}), (x_{max1}, y_{max1}), (x_{Len0}, y_{Len0})$ Interval 2: $(x_{Len1}, y_{Len1}), (x_{min2}, y_{min2}), (x_{max2}, y_{max2}), (x_{Len1}, y_{Len1})$ The same applies to the succeeding intervals.

FIG. 3 is an example of a graph showing the relation between the pixel position x and the data (pixel value) y. The values $(x_{max1}, y_{max1}), (x_{min1}, y_{min1}), (x_{Len1}, y_{Len1})$ above correspond to $(x_1, y_1), (x_2, y_2), (x_3, y_3)$ in FIG. 3. Interval parameter Len is expressed based on the origin (0, 0) as the absolute coordinate, similar to the concept of the length. Other expressions such as the relative coordinate (difference coordinate) is possible, but the expression using the absolute coordinate is easier to process.

In FIG. 3, lateral axis (x) shows the positions of the pixels in one line, and vertical axis (y) shows the corresponding color data values. For example, in interval 1 (reference numeral 301), specified are the starting point of this line (x=0) and coordinates (0, $y_0$) for the corresponding color data value, $x=x_1$ and coordinates $(x_1, y_1)$ for the corresponding color data value (maximum value), $x=x_2$ and coordinates $(x_2, y_2)$ for the corresponding color data value (minimum value), and $x=x_3$ and coordinates $(x_3, y_3)$ for the corresponding color data value.

In interval 2 (reference numeral 302), coordinates $(x_3, y_3)$ of the ending point of the first interval are selected as the starting point. This is because if the curved lines of each interval are not expressed as continuing formulae, then, when the compressed images are restored or enlarged, an undefined value is given to the interrupted portion, and there is a possibility of causing a hole in the image. In the second interval, further specified are $x=x_{max2}$ and coordinates $(x_{max2}, y_{max2})$ for the corresponding color data value (maximum value), $x=x_{min2}$ and coordinates $(x_{min2}, y_{min2})$ for the corresponding color data value (minimum value), and $x=x_{Len1}$ and coordinates $(x_{Len1}, y_{Len1})$ for the corresponding color data value.

<Step 205>

When the intervals in one line and the four points included in each interval, namely starting point, ending point, maximum and minimum points are obtained, line compression unit 24 prepares a simultaneous equation to gain the coefficients of the basic tangent function for each interval.

Under the first mode, four equations are gained from the basic tangent function (a division of the basic cubic equation) $f(x)=3ax^2+2bx+c$ and the final basic cubic equation $y=ax^3+bx^2+cx+d$.

For example, in the interval referenced by numeral 301, the following equations are gained based on the fact that the tangent inclination at the extreme values is "0."

$$f(x_1)=3ax_1^2+2bx_1+c=0 \quad (1)$$

$$f(x_2)=3ax_2^2+2bx_2+c=0 \quad (2)$$

The following equations are gained from the coordinates of both endpoints of the interval.

$$y_0=ax_0^3+bx_0^2+cx_0+d \quad (3)$$

$$y_3=ax_3^3+bx_3^2+cx_3+d \quad (4)$$

By solving equations (1)–(4) above, coefficients a–d are obtained, enabling the cubic function in interval 301 to be specified.

Now, concrete values will be used to explain. Assuming the color depth of the red element from starting point (0, 0) to display address "8" is "255," and the color depth of the red element at display address "20" is "16," then the maximum value is (8, 255) and the minimum value is (20, 16) in a certain interval in the coordinate system. Then equations (1)–(4) are as follows.

$$f(8)=192a+16b+c=0 \quad (1a)$$

$$f(20)=1200a+40b+c=0 \quad (2a)$$

$$y_0=ax_0^3+bx_0^2+cx_0+d=0, \text{ i.e. } d=0 \quad (3a)$$

$$y_3=ax_3^3+bx_3^2+cx_3+d \quad (4a)$$

<Step 206>

By solving the simultaneous equation obtained at step 205, it is possible to specify all coefficients of the cubic function. As described above, when a plurality of coordinates for each interval within one line are specified, the coefficient calculation unit 26 calculates coefficients a through d for each interval. By assuming the obtained coefficients are $a_0$, $b_0$, $c_0$, $d_0$, the cubic function defined in interval 301 would be:

$$y=a_0x^3+b_0x^2+c_0x+d_0.$$

<Step 207>

When all necessary interval data and the coefficient data for the intervals have been obtained for all intervals within one line, then data serialization unit 28 adds headers for writing the obtained data as files.

<Step 208>

These are stored in memory 30. When necessary, the data with the added headers are output to the exterior.

<Step 209>

When the processing in steps 201 through 208 have ended for one specific line, then the processing in steps 201 through 208 is repeated for one neighboring line. The headers above include header size, screen size, initial display size and data offset, etc.

As described above, according to the present embodiment, the image for one line is divided in certain intervals, and in each interval, the color data values are expressed through basic cubic equations for the pixel position. Therefore, as the image is expressed through the coefficients of the basic cubic equation and information on the interval, it is possible to reduce its data size considerably compared to the original image data.

Memory 30 stores the obtained data (data headers, coefficient data, etc.), and is also used as the working area for each unit to perform its processing and as a buffer for the data obtained by each unit.

Next, the operations of expansion circuit 14 under the first mode will be described. FIG. 4 is a flow chart showing the process implemented by an expansion circuit according to the present embodiment in outline.

<Step 401>

In expansion circuit 14, interface unit 32 first receives the data with the data header added thereto. This data may be obtained from compression circuit 12, or in a form stored in a memory medium such as an optical disc or floppy disc after being prepared by compression circuit 12, or from another computer system via a communication line (not illustrated).

<Step 402>

Interface unit 32 refers to the data header, and after initializing each unit in expansion circuit 14, transfers the coefficient data (a through d) for each line to line expansion unit 34. Line expansion unit 34 inserts the coefficient data in the basic cubic equation (expansion formula) $y=ax^3+bx^2+cx+d$. Thereby, a cubic function is defined for each interval in one line.

<Steps 403, 404>

Next, a value x indicating the horizontal position of the line is inserted said basic cubic equation to obtain the corresponding color data value y. x is successively given according to the scanning process. For example, when using raster scanning, the integers from x=0 to 639 are successively given.

<Step 405>

The obtained data is supplied from bit map transfer unit 36 to a display apparatus which is not illustrated. The interval and coefficient data supplied from compression circuit 12 are, as it were, character parameters defined according to the image data for each line. Bit map transfer unit 36 replays the original image data from the character parameters. The output from bit map transfer unit 36 is successive pixel data, and the output form is the same as conventional forms.

In the present embodiment, the y values are adjusted to be within a predetermined valid range, and decimal or smaller values are rounded off.

<Operations of Zoom Expansion Unit 40>

There are cases where images should be shown in enlargement and not in their original size. In such cases, zoom expansion unit 40 is activated to implement the necessary processing. For example, if instructions to enlarge by z times is given to expansion unit 14, then the value inserted in variable x in the above-mentioned basic cubic equation (expansion formula) is not an integer but for example a fraction. For example, they value (i.e., color data value ) corresponding to x=n/z (n is selected so that x scans such interval in whole; for example, if the starting and ending points of the interval are $x_{Len(i)}$, $x_{Len(i+1)}$, then $z \cdot x_{Len(i)} \leq n < z \cdot x_{Len(i+1)}$) is calculated.

When for example explaining a case of enlargement by four times, then in FIG. 5 which shows the situation of interval 1 denoted by reference numeral 301, the interval denoted by reference numeral 301 has x=0, 1/4, 2/4, 3/4, 1, 5/4, 6/4, 7/4, 2, 9/4 . . . , and the corresponding color data values are calculated from the cubic function.

As is clear from the description above, because the pixel data for the enlarged display is to be calculated based on the cubic function that is a continuous function, the adequate image data can be obtained regardless of the value of enlargement rate z. Therefore, when enlarging the images, it is possible to prevent the image from getting rough and to obtain a better image. Value z indicating the enlargement rate is not limited to integers; it is also possible to use decimal numbers (numbers with floating decimals). In conventional bit map methods, the obtainable data was discrete, so the enlargement rate could not be set arbitrarily, and the image data after enlargement was very rough.

The description above relates to enlargement, but it is similar for reduction. For reduction, it is possible to set the enlargement rate arbitrarily, obtaining a better image.

Similar as with compression circuit 12, in expansion circuit 14, the memory may also be used as the working area for each unit to perform its processing and as a buffer for the data obtained by each unit.

In this way, according to the operations of the first mode (point pixel mode) of the present embodiment, the image is expressed through the coefficients of the basic cubic equation for each interval and the information indicating the interval, so the image quality does not become inferior, and it is possible to considerably reduce the data volume compared to the original image data. In the expansion circuit, it is possible to restore an image with good image quality. It also suffices to obtain the coefficients of the basic cubic equation for an interval including maximum and minimum values, so data processing is very light, enabling use with a comparatively low-performance computer, and allows speedy processing.

1.2 Operations in Second Mode (Full Pixel Mode)

Next, the operations of compression circuit 12 under the second mode will be explained. Under the first mode described above, a basic cubic equation was calculated for an interval containing certain extreme values to obtain the necessary color data values, but according to this method, the data for such interval other than the four points used to obtain the coefficients of the basic cubic equation are not necessarily reproduced in an accurate way. The basic cubic equation is no more and no less than an approximation. For example, the image data in the interval between $x_a$ and $x_b$ in FIG. 6, an enlarged view of the graph in FIG. 3, are neglected in the processing in the second mode. Therefore, under the second mode (full pixel mode), the basic cubic equation is solved to correctly express all pixel data, thereby accurately reproducing all pixel data for a certain line.

Specifically, line compression unit 24 prepares a simultaneous equation as follows.

Assuming data y(x) for one specific line is y(0), y(1), y(2), . . . , y(639), For the first four points, the following four equations are obtained.

$y(0)=d$ $y(1)=a+b+c+d$ $y(2)=8a+4b+2c+d$ $y(3)=27a+9b+3c+d$

The coefficients of the cubic functions in interval 0 to 3 are obtained.

Similarly, the following four equations are obtained for the next four points.

$$y(3)=27a+9b+3c+d$$

$$y(4)=64a+16b+4c+d$$

$$y(5)=125a+25b+5c+d$$

$$y(6)=216a+36b+6c+d$$

Now, similarly, the basic cubic equation is solved for each interval including four pixel data for one line. For example, if one line contains 640 pixels, 214 equations are obtained. Coefficient calculation unit 26 solves these equations to obtain the coefficients for each interval. Based on the equations expressed with these coefficients, the 640 pixel data are expressed accurately. The operations in expansion circuit 14 are the same as in the first mode, so a description will be omitted.

Furthermore, concerning the starting and ending points of a coordinate group, as seen with the common point y(3) in the example above, the ending point of the adjacent coordinate group in the front (upstream) direction and the starting point of the adjacent coordinate group in the back (downstream) direction are preferably the same. This is to prevent "holes," as explained at the first mode.

In the second mode, the number of coefficient groups is comparatively larger than at the image data compression in the first mode. Therefore, although the compression rate is inferior, it is possible to obtain a basic cubic equation that more adequately follows changes in the color data values. For example, it is possible to adequately compress even images with many harmonic components, and it is possible to restore excellent images at expansion circuit 14. Also, the quality of the images reduced and enlarged by zoom expansion unit 40 is very high.

In addition, there was a basic problem with conventional enlargement and reduction processing. In the expansion processing, the higher the expansion rate, the rougher the screen. On the other hand, in the reduction processing, there was a problem which pixel should be selected as the representative one among a plurality of pixels. For example, the maximum pixel was selected, or the average value was selected as the representative value. The selected representative value affected the quality of the reduced screen. Also, for a reduction by one over one point five, it was necessary to prepare a special intermediate screen. These were unavoidable problems stemming from the principle of processing in pixel units. The present embodiment provides different principle to solve this problem.

Furthermore, it is also possible to apply the two modes together. For example, it is possible to automatically switch between the two modes for sections of image data to be converted based on the inclination of the difference in graphs and the length up to the detected coordinate.

1.3 Description of Third Mode (Advanced Pixel Mode)

This mode is a combination of the full pixel and point pixel modes described above. According to the inclination of the difference and the length to the detected coordinate, it is automatically switched between the first and second modes in section units of the gradation data to be converted. For example, as shown in FIG. 6, when there are harmonic components, the level changes in small intervals, and a complete reproduction is impossible under the point pixel mode, it is automatically switched to the full pixel mode. When the point pixel mode is set as the default mode, there is no need to implement high quality processing more than necessary, and efficient processing is performed. In this case, it is also possible to apply a conversion method using a multiple-dimensioned equation instead of the cubic equation.

Now, the related art will be described below.

The scanning method used to input the gradation data in the continuous gradation conversion unit may be any one of the five from the line scanning, folding scanning, block scanning, zigzag scanning and frame scanning methods. According to the features of the input data to be converted, it is switched to the adequate method. The basic operations of each scanning method are described below.

1. Line Scanning Method

This method scans the data in the horizontal direction (H) of the data to be input. The data for one line (1H) is processed as one large unit. It is also possible to scan the data in the vertical direction (V) of the data to be input with one line in the direction of the height as one unit. This method is mainly used for the output format to a raster scanning display and printer apparatus. It is also used for processing audio data with serial data row structure as the input data. As this method can be implemented simply by repeating the process for units of one line, high-speed processing is possible. However, when the row has a relationship between the width and height such as with image data, data compression is possible in the horizontal direction (width) as the minimum data unit is the unit of one line, but as compression in the vertical direction is not possible, the compression rate is not very high. Therefore, this method is effective when building a very fine conversion system real time where compression rate is not very important.

2. Folding Scanning Method

This method aims at maximum continuous gradation and compression rate. The scanning direction and data row for all input data have a serial structure. Specifically, data are scanned in the horizontal direction of the data to be input, and the next line is scanned in the horizontal direction opposite to the scanning direction of the previous line. Compared with the line scanning method, relationship with adjacent data in the vertical direction (height) is maintained, so it is possible to process the data in horizontal (width) and vertical (height) direction with a formula, so high compression rate can be expected. For example, data of one color with no changes, image data with repeated patterns, and audio data with no sound or repeated frequency can be expressed through one formula. As the data row is serial, it is suited to the Internet, digital broadcast and other serial telecommunications systems. Furthermore, as the compression rate is high, it may be applied to image data filing systems. When outputting from the folding scanning method to a raster scanning apparatus, it is necessary to rearrange the order of the data into raster scan arrangement (line scanning), so processing is slower than with the line scanning method, but by mounting an exterior line buffer, real time conversion output is possible.

3. Block Scanning Method

The block scanning method differs from the "compression with almost no loss" of the line scanning and folding scanning methods, and performs "compression with much loss." The data volume is reduced by thinning out alternating harmonic components. Within the range where data are to be thinned out, data exceeding a difference value set within the difference non-detection range register is discarded as data that should not be converted. When discarding data, the thinned out data are less conspicuous in an 8 by 8 block unit, so the input data are divided in 8 by 8 matrices (64 pixels), and scanning is performed in block units of 8 by 8 in the horizontal direction. Horizontal direction scanning at the next line is performed in the opposite horizontal direction as the scanning direction of the previous line. This method discards data, so complete replay of data with no difference to the original data is not possible, but the data volume can be considerably reduced. Data replay rate (difference between the original data and the converted data) depends on the value set at the difference non-detection range register (0–63), and if a too large value is set, the matrix pattern comes out when enlarged. This method is applicable to low-speed telecommunications systems that do not require a very high resolution. By placing this method on a higher hierarchical level than the high-resolution method, it is possible to use the obtained data as preview data for the high resolution data. All data with the large volume is highly compressed with the block scanning method and transmitted to the client, then the portions which the client needs are transmitted as high-resolution data obtained by line scanning or folding scanning, thereby reducing the overhead from transmission of unnecessary data.

4. Zigzag Scanning Method

This architecture may be placed on the main system or on the subsystem of an apparatus for expanding JPEG data, as it can implement very fine processing when expanding file storage data of JPEG international standard format. The image data is divided in 8 by 8 (64 pixels) matrices, and the 8 by 8 are scanned in zigzag direction as one block.

5. Frame Scanning Method

When placing pixels in the order of time multiplied by width, the continuous gradation conversion compression processing is performed in the frame direction. In other words, a formula is created to define the data row obtained by placing the same point in each frame in the order of time (e.g., when frames are arranged in the order from 0 to 9, then the 10 frames in this order).

Embodiment 2

Now, a second embodiment of the present invention will be described below. As shown in the block diagram in FIG. 7, compression circuit 112 of image processing apparatus 100 of the present embodiment comprises, instead of a line scanning unit, a block scanning unit 122 that calculates the necessary coordinate group for each block of a predetermined range (e.g., 8 pixels by 8 pixels), and a block compression unit 123 for compressing such blocks (i.e., creating a simultaneous equation). Accordingly, expansion circuit 114 also comprises a block expansion unit 134 to restore color data values for each block.

In the case of block scanning, both the first and second modes as with the case of raster scanning can be applied.

Block scanning unit 122 of compression circuit 112 takes a block of predetermined size (e.g., 8 pixels by 8 pixels) from the image data, sets the starting point at one end point of the pixel for one line in this block and the ending point at the other end point to calculate the extreme values within this interval and the corresponding x-coordinates.

For example, if the image of the block is made of 8 pixels in the horizontal (lateral) direction and 8 pixels in the perpendicular (vertical) direction, one block is made of 64 pixels, i.e., 64 data. This can be expressed in RGB data for example as follows.

$$y_R(x): y_R(0), y_R(1), y_R(2), \ldots, y_R(63)$$
$$y_G(x): y_G(0), y_G(1), y_G(2), \ldots, y_G(63)$$
$$y_B(x): y_B(0), y_B(1), y_B(2), \ldots, y_B(63)$$

Line compression unit 24 calculates the coordinates of the starting point, minimum and maximum values and the ending point of the block specified by block scanning unit 122. These coordinates are given to coefficient calculation unit 26 and coefficient calculation unit 26 calculates the coefficients (a through d) of the basic cubic equation.

When the coefficients of the basic cubic equation have been calculated for all lines of a certain block, then the processing is performed for the adjacent block. By repeating this procedure, the coefficients of the basic cubic equation for all blocks into which the image was divided can be obtained.

In expansion circuit 114, block expansion unit 134 inserts the coefficient data into the basic cubic equation (expansion equation) $y=ax^3+bx^2+cx+d$, inserts an x-coordinate of one line of a certain block in the same basic cubic equation and calculates the y-coordinate which is the corresponding color data value. By repeating this procedure, it is possible to restore the image data.

Experiences by the applicants have shown that by processing data in block units as in the present embodiment, the compression rate is higher than in the case of processing data in units of one line as described in the first embodiment. Furthermore, there are cases where lateral and vertical matrices appear in the static image obtained by restoring the data compressed above at the expansion circuit. However, with dynamic images (e.g., 30 frames per second), these matrices were hardly recognized. Accordingly, the present embodiment allows further improvement of the image compression rate, and quality is hardly deteriorated when applied to dynamic images.

Embodiment 3

Now, the algorism of processing related to the present invention will be described. The processing below are applicable to both embodiments 1 and 2 described above.

1. Valid Length

Each equation of the compression conversion function has an effective length. The effective length depends on the number system of the target system to be processed. In a system with a number system of 32 bits, one data will be expressed in a length of 4 giga-words (bytes). In a static image, this means that the width and height can designate this length, and theoretically, 4 giga-word lengths can be designated for the width and height, respectively (generally, there will be no such large static image required, and the normal screen structure mostly uses 16 bits). However, concerning the time axis of the frames of a dynamic image, there is a possibility that it will be unlimited, so in the embodiment of the present invention, the two methods below will be defined depending on the maximum effective length to be processed.

1-1. Absolute Distance Method

The distance between the points of change of each gradation data are all based on the origin of the coordinate system as the reference point. FIG. 13 shows this relation. The maximum effective length of the relative distance depends on the bit number composing the length data from the reference point.

1-2. Difference Distance Method

The distance between the points of change of each gradation data is based on first distance coordinate point of the adjacent equation's effective length. This relation is shown in FIG. 12. The maximum effective length of the difference distance is applied to the effective length of each equation unit. According to this method, practically unlimited expression is possible in the display time of a dynamic image, etc.

2. Point of Change Detection Method

Each of the neighboring gradation data are compared in the direction of the distance, and the extreme values and x-coordinates in a certain interval are detected. If neighboring data are the same or within a difference range set in the difference non-detection range register, then it is deemed that there is no change, and run-length compression that does not renew the data is performed. According to the basic operation, the first data in an interval is set as pixel(n), the next data is pixel(n+1), and pixel(n) is inserted in a_Prev register, and thereafter pixel (n+1) is inserted in a_Now register. Upon comparing a_Prev and a_Now, if a_Prev=a_Now, then the registers are not renewed. Another condition for no renewal is that if the value set at the difference non-detection range register is within a permissible range, the data is not renewed. The renewal condition is that if a_Prev>a_Now, then the minimum value is renewed, and in any other case, the maximum value is renewed. The processing described above is successively performed to prepare four coordinates (or more in the case of multiple dimensions) fulfilling the equation.

3. Component Conversion

The color component conversion of the image data is part of the redundancy avoidance process, and the algorism is realized through a method that does not depend on color space. Therefore, as color is processed as each component, the color space (RGB, YCbCr, CMYK, etc.) image data compression is possible. For example, when converting from RGB to RGB, if the conversion rate has priority, then the RGB→YcbCr→RGB route may be taken for conversion. YCbCr concentrates the majority of its component data on brightness, having little relating to chrominance, so if the color components are independent, the compression rate is very good. YCbCr can also reduce the space resolution of the chrominance components of Cb and Cr. Chrominance need not be as frequently sampled as with brightness, and for Cb and Cr, one out of two can be reduced. Thereby, in the conversion from RGB to YCbCr (4:2:2), the data volume can be reduced to ⅔. As shown below, the RGB components can be converted into YCbCr components through linear conversion.

$$\begin{bmatrix} Y \\ Cb \\ Cr \end{bmatrix} = \begin{bmatrix} 0.299 & 0.587 & 0.144 \\ -0.169 & -0.3316 & 0.0500 \\ 0.500 & -0.4186 & -0.0813 \end{bmatrix} \begin{bmatrix} R \\ G \\ B \end{bmatrix}$$

4. Band Filter Processing

This processing is the step before the formularization, and can considerably reduce the data volume after formularization by eliminating noise components of a degree not sensed by human beings. By restoring the original image accurately and improving it, the band filter processing is necessary before the formularization. The image data captured by a digital camera or scanner of low resolution often contains regular high-frequency components, and these components show up as noise on the display or printout, and the replay properties are not well, either. This function allows the inferior quality original data to be improved by removing the high-frequency component of a certain cycle. Through this processing, the "data containing noise components" after band filter processing is removed of only the noise components and the important components remain. The necessary components such has the image and audio data are not cut, and only the noise components are cut, so the degree of clearness is higher than with the normal smoothing method, thereby improving the replay properties. The removed components can be designated by frequency detection coefficient (kFreq) and amplitude coefficient (kPeak).

1 kFreq gradation data number−1

If "1" is designated, there is no change in the results after processing. The nearer the designated value is to "1," the more harmonic components are targeted, and the nearer the designated value is to the gradation data values, the lower-frequency components are targeted, so the components near a direct current component with the average phase of all gradation data, but do not completely equal a direct current component. kPeak is the difference of adjacent gradation data, and the gradation data within the range fixed for kPeak will be removed. Components exceeding the fixed range are reflected in the data after processing as the elements of the gradation data. The range of values that can be designated is, expressed in integers, as follows.

0 kPeak maximum gradation data (e.g., for 8-bit gradation data, 255)

If "0" is designated, all gradation data are removed. The nearer the designated value is the maximum gradation value, the more alternating current components are cut, so the components near a direct current component, but do not completely equal a direct current component. If kFreq is designated as "1," then kPeak is meaningless. The relation between kPeak and the data to be removed is as follows.
Data to be removed kPeak<data that are not to be removed The value to be compared with kPeak is the absolute value of the difference of adjacent target data.

5. Expanded Contour Correction Function (Split Processing)

This process can maintain sharp gradation data properties with no rounding usually occurring at expansion. With conventional algorisms to make images very fine, when expanding images, areas with gradation data properties with little difference in adjacent data could maintain the optimum property while where the difference in the data has an abrupt property, then data rounding occurs at the boundary point. For example, when enlarging image data, boundaries with large color changes show symptoms similar to the "out of focus" as with cameras, and as result, the visual sharpness of the image quality is aggravated. The present function solves the rounding at gradation data expansion, and offers replay results that are extremely similar to the original gradation data. An outline of the processing is shown in FIG. 15.

As shown in FIG. 15, when expanding by n times without using the expanded contour correction function, the boundary points A and B are connected by an inclined waveform. In this section, intermediate level data between A and B will be inserted at replay, being expressed as rounding. The apparatus according to the present embodiment (IC) performs contour correction processing so the inclination between A and B is resolved to avoid rounding, as shown in the drawing.

The boundary range containing the data to be processed by contour correction processing is processed in "split" units. These split units are designated by the split coefficient kSplit. kSplit is designated within the data weight coordinate axis, and theoretically can be set within the range below.
Minimum gradation kSplit maximum gradation (e.g., for 8-bit gradation data, 0–255)

However, the actual set values for the processing is equivalent to the difference of the detected boundary points, so, as shown in FIG. 15, the difference between A and B will be the range of the absolute values. (In the case of the example in FIG. 15, it is assumed that the values are set within A<kSplit<B.)

When performing the contour correction processing, there will be no inclination in the waveform between boundary points A and B, and no intermediate level data between A and B will be inserted during replay, so it is possible to maintain acute-angled (rising and falling edges) data structures, thereby resulting in replay results extremely similar to the original gradation data.

6. Gradation Adjustment Function (Chromatic Processing)

If the captured gradation data components contain components of a small level on the whole and these components are difficult to express (dark image data and hardly audible audio data), then small differences in these data are amplified for easier expression. As shown in FIG. 14, the gradation adjustment function amplifies the gradation data within a range of minimum to maximum gradation of the original data. Taking the image data as an example, it is possible to amplify intermediate colors within the range of the minimum gradation "black" and the maximum gradation "white." For example, when there is data of a dark and hardly visible image, and component data for a "person" exists in a certain area in a small level, then it is possible to specify the person through the present processing. According to a method where all image data are processed by a fixed value of brightness, the brightness of whole screen becomes too strong, and the color intensity of the color boundary lines is too high, so it is difficult to discern the contours. According to the present function, the contours are maintained at their present state in order to maintain the levels "white" and "black" at their original levels. The amplification rate is designated by the chromatic coefficient kchroma. The minimum gradation of image data, etc., is "0," and as the chromatic processing result is also "0," level "black" is maintained as is, and in the other parts, if the chromatic processing result exceeds the maximum gradation, the result is adjusted to the maximum gradation. Concerning the range in which kChroma can be designated, the standard is "1," and no amplification is conducted. By designating values larger than "1," the level is amplified. By designating values smaller than "1," the level is reduced, so this process is used for damping processing when the amplitude of the original data is too large. In the case of color images, the processing is performed independently for each of the RGB data, so it can be used for color adjustment.

7. Gradation Highlighting Function

Gradation data are processed to have strong and weak levels by setting a reference level (threshold value) to vary the gradation data. For example, with image data, this function may be used to adjust the color and partially highlight the color. As shown in FIG. 16, the gradation highlighting function amplifies and attenuates the original gradation data within the range from minimum to maximum gradation based on the reference level. According to this method, a reference level value kRef is designated for each gradation data, and gradation data exceeding kRef is multiplied with highlighting coefficient kEmpha_U, and gradation data falling below kRef is multiplied with highlighting coefficient kEmpha_L. The designated ranges of each coefficient are shown below.

Minimum gradation kRef maximum gradation
kEmpha_U 1.0
kEmpha_L 1.0 (not 0)

If the result of multiplication is equal to or less than the minimum gradation, the data is adjusted to the minimum gradation, and of the result is equal to or larger than the maximum data, the data is adjusted to the maximum gradation. In the case of image data, it is possible to perform color adjustment processing (brightness, contrast, gamma correction, shade, color depth, etc.). It is also possible to perform smoothing, sharpening, contour detection (negative, positive), mosaic effects, shading, blurring, etc., and also filter processing of intermediate, maximum and minimum values. By combining these functions, this method is also applicable to DVE (digital video effects).

8. Dynamic Image Compression Function (Frame Binding Processing)

Frame interpolation and frame prediction is performed for dynamic image data. In case of a dynamic image data with unchanging background and only a person moving, the coordinate data for the same point in each frame for such background remains unchanged. If the person is moving in a certain direction, frame interpolation and prediction is performed by formularizing the relationship of changes in coordinate data between frames along the time axis. The concepts of frame interpolation and frame prediction are described below.

8-1. Frame Interpolation

The relationship between the coordinates of the same point in successive frames and the distance between each frame are converted into a formula. FIG. 17 shows the screen of a dynamic image where an object (e.g., ball) moves from the left side to the right side of the screen. The relationship between each frame and the lapsed time (length) is shown in FIG. 18. FIG. 19 shows how points A, B, C and D in the first frame of FIG. 18 change with time. Next, assuming that the relationship between points C' and D', and points C" and D" in the direction of movement for units of one screen from frame 2 to frame n is ΔCD, the object at point C' in frame 2 nears D" in frame n with the change of time from frame 2 to frame n, and when time has lapsed to display frame n, then the object that was at point C' is displayed at point D". This is shown in FIG. 20. The relationship ΔCD between point C' and time (t) in FIG. 20 is formularized via the algorism according to the present embodiment. The relative relationships between the frames are shown in FIG. 21. In other words, this relationship is a self-similarity relationship along the time axis between each frame. Therefore, frame interpolation and compression is possible simply by repeating calculations using a formula group and a repetitive function system.

By changing the variable t at all frame positions above, it is possible to move to any desired frame along the time axis, so in the case of a dynamic image with digital data structure, it is possible to realize the functions of rewinding, fast-forwarding and temporary suspension of a video tape recorder, for example. By changing the relative relationship to the time axis, it is possible to realize slow replay.

8-2. Inter-Frame Prediction

The relationship of changes occurring with a certain regularity within the same area (or the whole area) between successive frames is formularized. FIG. 22 shows the change in a certain area A (this area may be irregular in shape) where the color intensity (color weight) is reduced with the lapse of time. For example, sunset or sunrise. In this paragraph, a change from light gray to dark gray will be explained. Area A of frame 1 will be taken as reference, and the relationship of the changing color weight up to the final changed area A" of frame n is expressed via a functional coordinate system in FIG. 23. It is possible to apply the algorism of the present embodiment to formularize the relation between area A and time (t).

If the color weight and time (t) of frame 1 and frame n are fixed, it is possible through the obtained equation to omit screen data for area A for the frames in-between in FIG. 22. This explanation relates to a single gray scale, but it is possible to designate independent functional equations for each color R, G, and B, and process each divided area (irregular shape, etc.) of the screen, so it is possible to express various predictions with minimum data.

8-3. Movement Compensation

The frame interpolation and inter-frame prediction are not only conducted for the same position within the screen but for an area expanded in horizontal or perpendicular direction. The area in a certain frame is moved by a certain range of pixels at the adjacent frames and compared with each other. The position where the difference between the original area and the moved area becomes small is detected (movement vector), and the vector between the frames is calculated. The calculated difference vector is used for transfer at the formalized level through the "area transfer function" described below. In order to calculate the movement vector, either a certain range is compared in whole, or a certain representative point and its surrounding is compared, taking the target system.

9. Reference Length Division Processing

This processing is to manage formularized data. This processing allows free editing and searching of the formularized data. When formularizing data in the horizontal or perpendicular direction of the screen (pixel length) or the direction of the time axis of the dynamic image and the sound (time length), the effective length of adjacent formulae is not necessarily the same, so when taking out only a partial area of the whole structure, or defining a relation between the time length of dynamic image frames and frame screen unit, management will become very difficult and require much processing time. In order to facilitate this defining of a relation, it is possible to provide a reference length division function. According to this basic principle, a coordinate point is referred to in certain fixed periods for sampling purposes, and a regular valid length of formulae is ensured. The periodically sampled coordinate points are arranged in matrix-form, so these are called virtual matrices. Now, the screen division and length division will be described below.

9-1. Area Transfer Function (Screen Division)

This function can perform the BitBLT (BitBLT =Bit Block Transfer) according to which a common, conventional physical bit map is transferred to another area, on the formalized level. In image processing, the function of transferring an area in the screen to another area is common. This function is generally called BitBLT. According to conventional methods, the physical bit map is copied/transferred, requiring transfer of a data volume corresponding to the width x height of the pixels in the area to be transferred, which was time-consuming. The present method allows transfer of formalized data of the area to be transferred and real time expansion, so the data transfer volume can be considerably reduced, allowing high-speed processing. Especially when a large area is to be copied/transferred, there is a large difference compared to the conventional method.

The minimum transferable unit is set within the range length kMatx_x, kmatx_y. The size of the range is determined by kMatx_x, kMatx_y, as follows.

0 kMatx_x valid screen width−1
0 kMatx_y valid screen height−1

When both coefficients are set to "0," no screen division is performed. When set to "1," the unit is one pixel, and all pixels on the screen are divided, allowing transfer in pixel units. The parameters can be set individually, providing the freedom of designating the transfer unit according to the image and purpose of use.

9-2. Frame Search Function (Length Division)

Synchronization, search and transmission of dynamic image frames and audio data are performed at the formularized level. Assuming the frame length sectioned at the sampled frequency is a section (section (S)). The time between frames is set to the section length kMatx_x, kmatx_y. The size of the section is determined by kMatx_x, kmatx_y, as follows.

0 kMatx_x last frame time (length)
0 kmatx_y valid screen width−1

When both parameters are set to "0," no length division is performed. When set to "1," the unit is one frame, and all frames are divided, allowing search of all frames. The coefficients can be set individually, providing the freedom of designating the resolution according to planar image and frame structure.

10. Audio Synchronization Function (Layered Synchronization Division)

Audio synchronization function allows maintenance and management of the synchronization relationship between the image frame layer and the audio data layer during the processing of dynamic images. When moving to an arbitrary frame such as during fast-forwarding and rewinding of image frames, it is necessary to search the data position of audio data corresponding to the frame. Synchronized processing of image frames and audio data is also necessary for restoration processing when errors occur such as time lags and missing frames during data telecommunications for satellite communication digital broadcast or telephone lines. However, there are cases where temporary irregularly and regularly missing frames and missing sound can be avoided through the interpolation and prediction functions described above. The basic principle is the same as for the "length division," and audio data is formularized in the section units built through the sampling frequencies given between frames.

The concept of the synchronization of the frame layer and the sound layer is shown in FIG. 24. As illustrated, when audio synchronization processing is performed, the aggregate of frame and sound formulae is synchronized in section units. For example, when it is desired to go back from frame 8 to frame 3, then, as audio data corresponding to frame 3 is synchronized, it is possible to process and replay the aggregate of audio formulae. When frame errors occur at frame 6 and frame 7, then it is possible to access to audio data by moving to frame 9 (jumping operation). In this way, the present method allows synchronization processing of frame and sound on the formalized level, realizing time stamp processing in a dynamic image system.

11. Multi-Synthesis Function

Two or more gradation data are synthesized on the formula level. For image data, separate screens can be united into one screen, and for audio data, sounds independent from each other can be united into one sound source. FIG. 25 shows an example of the multi-synthesis processing of image data. By synthesizing an aggregate of formulae including two independent image data, the screen imposition function is realized. FIG. 25 is an example of a static image, but similarly with dynamic image data, it is possible to realize the sprite function with the foreground screen and the background screen. This can be applied to video games. For example, by placing a character in the foreground and the background in the background screen, this processing is used to move only the character in the foreground. Furthermore, it is possible to enlarge the character in the foreground with fine definition through the continuous gradation processing, editing and replaying a realistic dynamic image.

12. Master and Slave Functions (Parallel Processing)

This function is a processing to connect with the basic length division processing described above for formularized data. The processing in the previous section can be performed in parallel. Specifically, there are the following parallel processing types.

Screen division parallel processing for the same fine-degree enlargement processing in the block units obtained by screen division through static image data processing Frame division parallel processing to process frames in the same time direction in the block units obtained by screen division through dynamic image data processing Space layer parallel processing for fine-degree enlargement processing of the frame screen after frame screen development via dynamic image data processing Parallel processing by layer for implementing image data processing and audio data processing as separate processes for dynamic image data Same layer parallel processing for performing dynamic image data processing or static image data processing simultaneously with multi-screen synthesis processing.

The above combinations of parallel processing are possible.

An example is given in FIG. 26. A frame is divided in one screen direction in the four blocks F-A, F-B, F-C, F-D. The corresponding blocks divided in time direction for these blocks F-A, F-B, F-C, F-D are T-A, T-B, T-C, T-D. Allocated to the divided blocks are apparatuses (IC) according to the present embodiment masters 0–3 and slaves 0–3, then parallel processing is performed, thereby allowing application to dynamic image systems with large screens and building very fine, enlarged dynamic image systems in real time.

Embodiment 4

Now, variations of the image processing apparatus comprising the above-described compression circuit and/or expansion circuit will be described below.

Below, the present invention is described as applied to a RAMDAC, a component necessary for a display electron device. A RAMDAC is used for personal computers, and used for a graphic board containing a color palette. It is named for having a random access memory (RAM) and a digital-analog converter (DAC). Conventional RAMDACS received pixel data, performed color palette conversion, further converted the data into analog video signals and outputted the signals. Conventional RAMDACs did not contain an image compression circuit or an image expansion circuit. The apparatus according to this embodiment 3 is a RAMDAC having the image compression circuit and image expansion circuit described above.

As shown in FIG. 8(*a*), RAMDAC 800 comprises a RAM 801 for temporarily storing image data, etc., a digital-analog converter (DAC) 802, an image processing apparatus 803 according to the present invention, and a controlling circuit 804. Image processing circuit 803 corresponds to compression circuits 12, 112 and expansion circuits 14, 114 according to the first or second embodiment. Image processing circuit 803 and controlling circuit 804 may be integrated into a single LSI or may be physically separate bodies. As described above, compression circuits 12, 112 compress and convert pixel data, and expansion circuits 14, 114 perform expansion processing to return to the original pixel data. Expansion circuits 14, 114 also have a zoom processing function, enabling enlargement and reduction of images.

RAM 801 of RAMDAC 800 obtains and temporarily stores image data from an external source. The stored image data are compressed based on the method above via image processing circuit 803, and compressed image data (coefficient data) are stored. The coefficient data given to RAM 801 is expanded by image processing circuit 803, and image data is restored. The restored image data is transferred to DAC 802.

In this way, by integrating image processing circuit 803 according to the present invention into RAMDAC 800, the following merits are gained.

(1) As the RAMDAC comprises image compression and expansion functions, image memory capacity does not need to be large compared to cases where image compression is not performed. Accordingly, the data volume transmitted to the RAMDAC from the personal computer is small and the data transfer speed is low. For example, if the screen refresh rate of the display apparatus receiving output from the RAMDAC is 60 Hz, as there is a memory inside the RAMDAC, the screen refresh rate seen from the personal computer is not affected by the refresh rate of the display apparatus, and it is possible to select an arbitrary rate. Therefore, the personal computer can perform processing of renewing the image itself and the output of the image independently from each other, so the freedom in designing the software and hardware becomes very large. This point is especially important when offering very finely defined images. For example, when comparing an image made of 640 pixels×480 pixels with an image made of 1280 pixels×960 pixels, the processing time for one pixel of the latter image becomes one-fourth of the time for one pixel of the first image. When trying to achieve finer definition, the performance limit of the software and hardware is exceeded. The RAMDAC according to the present invention can relieve computers from these restrictions from software and hardware.

(2) Similarly, seen from the computer, it is possible to reduce the clock speed for generating image signals, thereby relieving computers from these restrictions from software and hardware. For example, when displaying an image made of 1280 pixels×960 pixels at a refresh rate of 60 Hz, a clock of approximately 100 MHz is necessary. In a screen of even finer definition as targeted by the present invention, the clock reaches several hundred MHz, exceeding hardware limits. According to the present embodiment, the personal computer can perform processing of renewing the image itself and the output of the image independently from each other, so it is possible to set the input rate of the RAMDAC low (e.g., several ten MHz) and the output rate of the RAMDAC high (e.g., several hundred MHz). This is because by using an LSI, etc., for the RAMDAC, a very high clock inside the RAMDAC is permissible.

(3) As the RAMDAC comprises enlargement and reduction processing functions, there is no need to perform such processing with a software, reducing burden on the computer. Moreover, by using the method above, it is possible to perform enlargement and reduction processing of a high quality that was not obtained by the prior art.

The image processing apparatus according to the present invention can be mounted in a personal computer and can also applied to a full-color printer, game machine, etc. Examples of the fields of application are given below.

Display electron device with IEEE1394 interface (cathode-ray tube display, liquid crystal display)
Full-color printer
Compression of graphic data and screen effects for game machines
Interface LSI between a UMA, the memory architecture mounted on the next-generation personal computer, and a graphic system, or middleware
Image compression/expansion display on an internet browser (unification of preview and main images)
Integration algorism for image processing software manufacturers
Apart from images, application to audio signals is also possible.
This is described in further detail below.

1. Overall Structure

The overall structure is shown in FIG. 27. Compression/decompression unit 1000 is the core unit of the apparatus (IC) according to the present embodiment, and is a continuous gradation conversion compression/expansion unit. The gradation data is input, and continuous gradation conversion compression and expansion is performed. Also, the series of processes for zoom processing is performed with this unit.

A process sequence unit receives commands from the host and controls the internal processing of the apparatus (IC) according to the present embodiment. Concerning the command set architecture, there are continuous gradation conversion and graphic commands. The core unit performs the basic commands such as the arithmetic, logic, shift and control commands. The continuous gradation unit implements commands for converting gradation data into formularized data that do not depend on enlargement processing. The graphic unit implements graphic commands for displaying, transferring and editing of image data, and each unit is processed by parallel processing architecture. Accordingly, it is possible to implement simultaneous processing of image data and audio data efficiently.

A host command decoder 1001 receives macro-commands sent from the host interface and converts them into internal commands and performs the processing.

A process sequencer 1002 controls the processing of the compression unit and the decompression unit. It can rearrange the process sequence and change the processing of the data path (flow of processing data passage) to suit the external system structure.

A host interface 1003 performs transmission and receipt of commands and data to and from the host. It supports the register access mode and burst transfer, allowing high-speed data transfer.

A sequential bus interface 1004 inputs and outputs gradation data of image data and audio data. Both input and output is possible through data transfer in units of one transfer synchronization clock, so the speed is high. Handshake signals with external units allow application to low-speed electron devices.

A sequential data-out 1005 performs the processing of compressed data or original gradation data from the host interface or an SQ-in, and outputs the expanded data or the compressed data. For example, very fine, expanded data from the decompression unit is directly output to a D/A converter. By connecting the output from the D/A converter to the display apparatus, it is possible to display high-quality image data. As graphic commands are also provided that are largely converted into macros, implementation as a next-generation graphic chip core is also possible.

The sequential data-in 1006 receives compressed, expanded, or original gradation data from an external system, and sends them to each internal unit via an input data FIFO. For example, data from an A/D converter of a video capture system is directly input. Fine definition enlargement processing is performed for the input data at the decompression unit, and by outputting the processed data from SQ data-out, it is possible to build a fine definition video capture system at real time. Also, by using SQ data-in and SQ data-out independently from each other, real time conversion from NTSC to HDTV quality is possible, enabling enlarged display of an even finer definition.

2. Continuous Gradation Conversion Compression/Expansion Unit

This is a core unit of the apparatus according to the present embodiment (IC). This unit has completely incorporated the algorism described above in hardware. FIG. 27 is a functional block view of the main units. It has integrated four blocks of processing units, having pipelines for efficient processing of the processing steps. These pipelines optimize the sequential process and utilize the encoding and decoding processing speed of the gradation data at a maximum. Each unit is controlled by the process sequence unit. Each process path is programmable, and can be customized for optimum processing of the target system.

Compression unit 1100 is a unit for inputting and continuous gradation converting and compressing gradation data. The main processing units making up the compression unit are described below.

Line scanning unit 1101 inputs gradation data to be converted, investigates the relationship of adjacent data in the length direction and analyzes the relation. If adjacent data are the same or within the difference value set in the difference non-detection range register, it is deemed that there is no change, and run length compression without renewing data is performed. The results of data analysis by the processing above are used as the arrangement to be used for internal processing and transferred to the line compression unit described below. Line compression unit 1102 makes consecutive gradation data out of the arrangement elements transferred from the line scanning unit. The data structure after consecutive arrangement processing is calculated by a compression arithmetic unit and returned to the unit as coefficient data for internal processing, and the coefficient values are separated in elements.

Compression arithmetic unit 1103 is the main calculation processing unit for determining the related coefficient values from the data structure transferred from the line compression unit.

Least common multiple unit 1104 is a supplementary calculation processing unit for efficient calculation linked with the compression arithmetic unit.

Compression data serialization unit 1105 adds information headers to the data subjected to continuous gradation compression conversion by the compression unit, and outputs the resulting data to an external electron device.

3. Decompression Unit

This is a unit for inputting formularized continuous gradation compression data and expanding it. The main processing units making up decompression unit 1200 are described below.

Decompression data interface unit 1201 is a transfer unit for transferring formularized data input from an external electron device to a line decompression unit. It obtains header size, scanning method, horizontal/perpendicular size, data offset and other information from the information header added by the compression data serialization unit, and transfers the information to each unit and initializes them. After completed initialization, it transfers formularized data to the line decompression unit.

Line decompression unit 1202 operates as a subsystem of the zoom decompression unit. The formularized data input from the decompression data interface is expanded by using a typical weighting function, and the replayed data is output. As the process does not perform zoom processing as performed by zoom decompression unit, the processing is high-speed.

Concerning zoom decompression unit 1203, while the line decompression unit processes obtained data which is equal in size to the original data (zoom coefficient=1; 1:1), when other zoom coefficients are set (e.g., display enlargement of image data), the main expansion processing is processed with the present unit, and the line decompression unit operates as the subsystem. The processing is continued until the line decompression unit notifies the EOP (End Of Process), and the data replayed by expansion processing is temporarily stored in an image buffer. After EOP detection, the data replayed from the image buffer is transferred to a data/bitmap transfer unit, and converted into an object that can be replayed.

Data/bitmap transfer unit 1204 is described below. Replayed data transferred from the zoom decompression unit is converted into data receivable by the display electron device via the present unit to prepare the object. The present unit performs the output processing to an external electron device, and is structured to be applicable to external hardware interfaces with a degree of freedom.

An outline of the continuous gradation conversion operation of the apparatus according to the present embodiment (IC) is described below.

4.1 Input/Output Mode

Now, the data path of the converted data is described below. The present architecture has the four input/output modes below.

Host-in-out (HIHO)
Host-in-SQ(Sequential)-out (HISO)
SQ-in-host-out (SIHO)
SQ-in-SQ-out (SISO)

The basic operations of the input/output modes above are described below.

4.2 Continuous Gradation Compression 4.2.1 Host-In-Out Mode (HIHO)

FIG. 28(*a*) shows the flow of the processing data in the host-in-out mode during continuous gradation compression. Original data input from the host interface is written into an input data FIFO, and transferred subsequently to the line scanning unit. The read-in data is rearranged in order corresponding to the scanning method set at the line scanning unit, and simultaneously, analysis between adjacent data of data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. The processed coefficient data is transferred from the compression data serializer to the data/bitmap transfer unit. The data/bitmap transfer unit monitors the output data FIFO storage state and the host interface state, and, while adjusting the data transfer speed, transfers the compressed data to the output data FIFO. This function allows burst transfer between the host interface and the external bus. The output data FIFO is the final output of the internally processed data, and functions as the rubber band buffer between the internal synchronized pipeline and the non-synchronized host interface.

4.2.2 Host-in-SQ-out (HISO)

FIG. 28(*d*) shows the flow of the processed data under the host-in-SQ-out mode during continuous gradation compression. The original data input from the host interface is written into the input data FIFO, and successively transferred to the line scanning unit. The read-in data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. The processed coefficient data is transferred from the compression data serializer to the data/bitmap transfer unit. The data/bitmap transfer unit monitors the SQ data FIFO storage state and the SQ bus state, and, while adjusting the data transfer speed, transfers the compressed data to the SQ data FIFO. This function allows burst transfer between the SQ interface and the external bus. The SQ data FIFO is the final output of the internally processed data, and functions as the rubber band buffer between the internal synchronized pipeline and the non-synchronized SQ interface.

4.2.3 SQ-in-host-out (SIHO)

FIG. 29(*c*) shows the flow of the processed data under the SQ-in-host-out mode during continuous gradation compression. The original data input from the SQ-in is written into an input data FIFO, and successively transferred to the line scanning unit. The read-in data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in compression data serializer as coefficient values. The processed coefficient data is transferred from the compression data serializer to the data/bitmap transfer unit. The data/bitmap transfer unit monitors the output data FIFO storage state and the host interface state, and, while adjusting the data transfer speed, transfers the compressed data to the output data FIFO. This function allows burst transfer between the host interface and the external bus. The output data FIFO is the final output of the internally processed data, and functions as the rubber band buffer between the internal synchronized pipeline and the non-synchronized host interface.

4.2.4 SQ-in-SQ-out (SISO)

FIG. 30(*b*) shows the flow of the processed data under the SQ-in-SQ-out mode during continuous gradation compression. The original data input from the host interface is written into an input data FIFO, and successively transferred to the line scanning unit. The data is read out, and the input data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. The processed coefficient data is transferred from the compression data serializer to the data/bitmap transfer unit. The data/bitmap transfer unit monitors the SQ data FIFO storage state and the SQ bus state, and, while adjusting the data transfer speed, transfers the compressed data to the SQ data FIFO. This function allows burst transfer between the SQ interface and the external bus. The SQ data FIFO is the final output of the internally processed data, and functions as the rubber band buffer between the internal synchronized pipeline and the non-synchronized SQ interface.

4.3 Continuous Gradation Expansion
4.3.1 Host-In-Out Mode (HIHO)

FIG. 28(b) shows the flow of the processing data under the host-in-out mode during continuous gradation expansion. Compressed data input from the host interface is written into an input data FIFO. The read-in data is rearranged in order corresponding to the scanning method used at compression based on the parameters of the data information header at the decompression data I/F and sent to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the output data FIFO storage state and the host interface state, and, while adjusting the data transfer speed, transfers the expanded data to output data FIFO. This function allows burst transfer between the host interface and the external bus. The output data FIFO is the final output of the internally processed data, and functions as the rubber band buffer between the internal synchronized pipeline and the non-synchronized host interface.

4.3.2 Host-in-SQ-out (HISO)

FIG. 29(a) shows the flow of the processing data under the host-in-SQ-out mode during continuous gradation expansion. Compressed data input from the host interface is written into an input data FIFO. The read-in data is rearranged in order corresponding to the scanning method used at compression based on the parameters of the data information header at the decompression data I/F and sent to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the SQ data FIFO storage state and the SQ bus state, and, while adjusting the data transfer speed, transfers the expanded data to the output data FIFO. This function allows burst transfer between the SQ interface and the external bus. The SQ data FIFO is the final output of the internally processed data, and functions as the rubber band buffer between the internal synchronized pipeline and the non-synchronized SQ interface.

4.3.3 SQ-in-host-out (SIHO.)

FIG. 29(d) shows the flow of the processing data under the SQ-in-host-out mode during continuous gradation expansion. Compressed data input from the host interface is written into an input data FIFO. The read-in data is rearranged in order corresponding to the scanning method used at compression based on the parameters of the data information header at the decompression data I/F and sent to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the output data FIFO storage state and the host interface state, and, while adjusting the data transfer speed, transfers the expanded data to output data FIFO. This function allows burst transfer between the host interface and the external bus. The output data FIFO is the final output of the internally processed data, and functions as the rubber band buffer between the internal synchronized pipeline and the non-synchronized host interface.

4.3.4 SQ-In-Out (SISO)

FIG. 30(c) shows the flow of the processing data under the SQ-in-out mode during continuous gradation expansion. Compressed data input from the host interface is written into an input data FIFO. The read-in data is rearranged in order corresponding to the scanning method used at compression based on the parameters of the data information header at the decompression data I/F and sent to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the SQ data FIFO storage state and the SQ bus state, and, while adjusting the data transfer speed, transfers the expanded data to output data FIFO. This function allows burst transfer between the SQ interface and the external bus. The SQ data FIFO is the final output of the internally processed data, and functions as the rubber band buffer between the internal synchronized pipeline and the non-synchronized SQ interface.

4.4 Continuous Gradation Compression and Expansion
4.4.1 Host-In-Out Mode (HIHO)

FIG. 28(c) shows the flow of the processing data under the host-in-out mode during continuous gradation compression and expansion. Original data input from the host interface is written into an input data FIFO, and transferred subsequently to the line scanning unit. The read-in data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. This data is transferred from the compression data serializer via the decompression data I/F to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the output data FIFO storage state and the host interface state, and, while adjusting the data transfer speed, transfers the compressed data to the output data FIFO. This function allows burst transfer between the host interface and the external bus. The output data FIFO is the final output of the internally processed data, and functions as the rubber band buffer between the internal synchronized pipeline and the non-synchronized host interface.

4.4.2 Host-in-SQ-out (HISO)

FIG. 29(b) shows the flow of the processed data under the host-in-SQ-out mode during continuous gradation compression. The original data input from the host interface is written into an input data FIFO, and successively transferred to the line scanning unit. The read-in data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. This data is transferred from the compression data serializer via the decompression data I/F to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the SQ data FIFO storage state and the SQ bus state, and, while adjusting the data transfer speed, transfers the compressed data to the SQ data FIFO. This function allows burst transfer between the SQ interface and the external bus. The SQ data FIFO is the final output of the internally processed data, and functions as the rubber band buffer between the internal synchronized pipeline and the non-synchronized SQ interface.

4.4.3 SQ-in-host-out (SIHO)

FIG. 30(a) shows the flow of the processed data under the SQ-in-host-out mode during continuous gradation compression. The original data input from SQ-in is written into an input data FIFO, and successively transferred to the line scanning unit. The read-in data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. This data is transferred from the compression data serializer via the decompression data I/F to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the output data FIFO storage state and the host interface state, and, while adjusting the data transfer speed, transfers the compressed data to the output data FIFO. This function allows burst transfer between the host interface and the external bus. The output data FIFO is the final output of the internally processed data, and functions as the rubber band buffer between the internal synchronized pipeline and the non-synchronized host interface.

4.4.4 SQ-in-out (SISO)

FIG. 30(d) shows the flow of the processed data under the SQ-in-out mode during continuous gradation compression. The original data input from the host interface is written into an input data FIFO, and successively transferred to the line scanning unit. The data is read out, and the input data is rearranged in order corresponding to the scanning method set at the line scanning unit, and simultaneously, analysis between adjacent data of the data row is performed, and transmitted as one data group to the line compression unit. The line compression unit performs the formularization process in linkage with the compression arithmetic unit based on the results of analysis by the line scanning unit. The data output from the compression arithmetic unit is stored in the compression data serializer as coefficient values. This data is transferred from the compression data serializer via the decompression data I/F to the line/zoom decompression unit. The line/zoom decompression unit performs the expansion/fine definition enlargement processing at the enlargement rate designated in advance by the sequential unit, and transfers the processed data to the data/bitmap transfer unit. The data/bitmap transfer unit monitors the SQ data FIFO storage state and the SQ bus state, and, while adjusting the data transfer speed, transfers the compressed data to the SQ data FIFO. This function allows burst transfer between the SQ interface and the external bus. The SQ data FIFO is the final output of the internally processed data, and functions as the rubber band buffer between the internal synchronized pipeline and the non-synchronized SQ interface.

Now, an application of the apparatus (IC) according to the present embodiment will be described.

1. Standard System

The standard system is the system with the simplest structure. The apparatus according to the present embodiment is incorporated into a computer with various OS installed therein, performs fine-definition enlargement processing for data captured from a digital camera into BMP, JPEG or other data file types and outputs the data. The processed data may be printed via a color printer or via a large-format printing system. All input and output of data is performed via the host interface.

2. Interactive Image and Sound Transfer System

One application is an interactive communications transfer system such as video conference systems and telemedicine systems. Images captured by a video camera or video tape recorder is compressed with fine definition by the apparatus (IC) according to the present embodiment and transmitted. The receiving side displays the image on a TV screen through the fine-definition expansion enlargement processing by the apparatus (IC) according to the present embodiment. This system can send large-capacity, detailed information. By connecting the display to a local bus (SQ bus), input and output is performed.

3. Monitor Camera System

Another application is a communication image and sound information system such as a monitor camera. Using the compression/expansion functions of the apparatus (IC) according to the present embodiment, it is possible to transmit and receive image and audio data efficiently, and using the gradation signal amplifying function of the apparatus (IC) according to the present embodiment, it is possible to provide a monitoring system that can perform detailed analysis of images and sound. By storing compressed data sent from the mounted side to the external memory apparatus of the center side, it is possible to build a monitor information history database. On the mounted side, a video camera is connected to the SQI bus of the apparatus (IC) according to the present embodiment, and on the SQO bus, a modem, TA or other communications adapter is connected, and the compressed data is transmitted. On the center side, similarly, a communications adapter is connected to the SQI bus of the apparatus (IC) according to the present embodiment, and a display is connected to the SQO bus for output.

4. Communications Image and Sound System

Still another application is a communication image and sound system such as a "tele-karaoke" system. It is possible to replace the current system with this system without newly converting all resources in the current database. Also, using the compression/expansion functions of the apparatus (IC)

according to the present embodiment, it is possible to transmit and receive image and sound data efficiently, and using the gradation data editing function of the apparatus (IC) according to the present embodiment, it is possible to provide sound and image effects, building an even more realistic communications image and sound system. On the database server side, a modem, TA or other communications adapter is connected to the local bus (SQO bus) of the apparatus (IC) according to the present embodiment to provide output, and on the terminal side, similarly, a communications adapter is connected to the local bus (SQI bus) of the apparatus (IC) according to the present embodiment, and a display is connected to the SQO bus.

5. Fine-Definition PCTV

A further application is a recording and replaying digital video system, fine-definition video capture, etc., using the PC as a screen display platform. PCTVs have almost the same standard, and in the near future, they will be practically applied through the digital satellite communications broadcast. By fine-definition enlargement processing for this PCTV, it is possible to build a dynamic image system with a large screen, enabling digital recording/replaying on a PC.

6. Image Signal Format Conversion System

The present system may be applied for incorporation into consumer products. Using the current NTSC standard TV, it is possible to convert aspect ratio, frame number, scan line for high-resolution television.

7. RAMDAC Function-Mounted Graphic Accelerator Chip

Using the master and slave functions of the apparatus (IC) according to the present embodiment, parallel processing is performed. A master chip is used for real time fine-definition conversion, and the resulting data is transferred to compressed data memory. By using the slave chip for real time expansion processing, operation with less image memory compared to conventional products is possible. In other words, the same capacity memory as conventional products can be used to realize a larger screen size than conventional products. Furthermore, as it is possible to mount as the standard function a real time fine-definition enlargement function, so fine-definition enlargement function can be used for texture processing for game software, etc., thereby enabling display of a graphic screen that provides even more realistic live performance effects.

8. RAMDAC Substitute Chip

This application is a next-generation RAMDAC. It can be used as the substitute chip for a RAMDAC, the final stage output of existing graphic chips. The apparatus (IC) according to the present embodiment has an integrated color conversion mechanism that is more than the color look-up table of existing RAMDACs. Moreover, as this chip has a programmable band filter function utilizing high-speed digital processing, various color signal amplifying function and signal correction function and other signal conversion functions mounted thereon, it is possible to provide the image quality matching the used display apparatus (CRT, LCD, etc.).

9. High-End Graphic Sound System

This system is a graphic/sound system having the graphic accelerator chip and the next-generation RAMDAC described above, and that further performs parallel processing of the audio sound processing. For example, four of the apparatuses (IC) according to the present embodiment are used, and three are used for image processing, and one is used for sound processing. Very high quality images and acoustic signals can be provided. An example of an enlarged image to which the present invention was applied and a conventional enlarged image is compared in FIG. 31. It is clear that by applying the embodiment of the present invention, a natural image can be obtained.

The present invention is not limited to any of the embodiments described above, and various changes are possible within the scope of the invention as described in the claims, which are included in the scope of the present invention.

Furthermore, although the embodiments above use basic cubic equation coefficients obtained through a quaternary simultaneous equation, the present invention is not limited thereto, and coefficients of quadratic or higher equations may be obtained through polymeric simultaneous equations, quaternary or higher.

Although the embodiments above calculate the starting point, extreme values, and the ending point for lines (or blocks) in the horizontal direction, the present invention is not limited thereto, and it is possible to calculate the coordinates of the necessary points for lines (or blocks) in the perpendicular direction.

Moreover, in the present specification, the color data for each pixel may be indicative of a gray scale or color. If the color data shows a color, then it is normally expressed through the R value, the G value and the B value. Therefore, if the color data shows a color, the coefficients of the three basic cubic equations below are calculated for the first and second embodiments, and these are the coefficient data.

$R \text{ value}=a_R x^3+b_R x^2+c_R x+d$ $G \text{ value}=a_G x^3+b_G x^2+c_G x+d$ $B \text{ value}=a_B x^3+b_B x^2+c_B x+d$ The basic equation may also be a cubic or higher-level equation (e.g., quintic).

In addition, in the present specification, the term "means" does not necessarily denote physical means but includes cases where the functions of the means is realized through software. The function of one means may be realized through two or more physical means, and the functions of two or more means may be realized through one physical means.

According to the present invention, it is possible to provide an image processing apparatus which can obtain excellent images even after compression and expansion.

Also, according to the present invention, it is possible to provide an image processing apparatus which can enlarge and reduce images in a desired manner, and which can obtain excellent enlarged and reduced images.

I claim:

1. A continuous gradation compression apparatus comprising:

data division means which divides a plurality of data constituting image or acoustic data into groups of predetermined ranges;

formula calculation means which expresses each of the divided plurality of groups in relation with a data value corresponding to a position within the predetermined range as a polynomial equation having said position as the variable; and coefficient calculation means which calculates the coefficients to be assigned to each variable of said polynomial equation, wherein the coefficient data obtained by said coefficient calculation means for each of the divided plurality of groups is output as compressed data within said predetermined range.

2. A continuous gradation compression apparatus according to claim 1, characterized in that said data division means divides the original data into pixel or acoustic data groups for each line.

3. A continuous gradation compression apparatus according to claim 1, characterized in that said data division means divides the original data into data groups for blocks having a predetermined size.

4. A continuous gradation compression apparatus according to claim 1, characterized in that said formula calculation means detects the points of change in said data value, and obtains a polynomial equation based on said point of change and the corresponding position.

5. A continuous gradation compression apparatus according to claim 4, characterized in that said formula calculation means obtains at least the maximum value and/or the minimum value of the data value.

6. A continuous gradation compression apparatus according to claim 1, characterized in that said formula calculation means uses variable x for the position and y for the data value to solve a first formula $y=ax^3+bx^2+cx+d$.

7. A continuous gradation compression apparatus according to claim 6, characterized in that said formula calculation means calculates a second formula $y'=3ax^2+2bx+c$, which is the differential function of the first formula, and said coefficient calculation means calculates the coefficients in said second formula before calculating the remaining coefficients of said first formula.

8. A continuous gradation expansion apparatus that receives the coefficient data from the continuous gradation compression apparatuses according to claim 1 and restores the image or acoustics based on the data, characterized by comprising:

polynomial equation calculation means which inserts said coefficients in a predetermined polynomial equation; and expansion means which calculates the pixel data value corresponding to the pixel position based on the polynomial equation calculated by said polynomial equation calculation means, wherein said data value obtained by said expansion means is output as image or acoustic data.

9. A continuous gradation expansion apparatus according to claim 8, characterized by further comprising:

scale factor fixing means which fixes the scale factor for the image or acoustics; and interpolation means which calculates said pixel position based on said scale factor, and, based on the polynomial equation calculated by said polynomial equation calculation means, calculates the data value corresponding to the position calculated based on said scale factor, and thereby calculates positional data that is different from the original data.

10. A continuous gradation expansion apparatus according to claim 8, characterized by further comprising a expanded contour correction unit which, when data is expanded by said expansion means and rounding occurs at data boundaries, the data is corrected to approximate the original gradation data to solve said rounding.

11. A data processing apparatus constituted of:

a continuous gradation compression apparatus according to claim 1, and a continuous gradation expansion apparatus that receives the coefficient data from the continuous gradation compression apparatus and restores the image or acoustics based on the data, characterized by comprising:

polynomial equation calculation means which inserts said coefficients in a predetermined polynomial equation; and expansion means which calculates the pixel data value corresponding to the pixel position based on the polynomial equation calculated by said polynomial equation calculation means, wherein said data value obtained by said expansion means is output as image or acoustic data.

12. A data processing apparatus according to claim 11, characterized by comprising a constituent element conversion unit which, when using image data, converts constituent elements from the RGB color space to the YCbCr color space, and/or from the YCbCr color space to the RGB color space to improve the compression efficiency.

13. A data processing apparatus according to claim 11, characterized by comprising a band filter unit which, before the processing by said continuous gradation compression apparatus, removes noise components specified by a frequency detection coefficient and an amplitude coefficient from the data.

14. A data processing apparatus according to claim 11, characterized by comprising a gradation adjustment unit which, when a portion of the captured gradation data components are not expressed, small differences are amplified and adjusted to express components that were not expressed.

15. A data processing apparatus according to claim 11, characterized by comprising a gradation highlighting unit which, based on a predetermined threshold value, adjusts the gradation level to highlight gradations.

16. A data processing apparatus according to claim 11, characterized by comprising a dynamic image compression unit which expresses the relation between position and time in a frame for data relating to a plurality of frames in the form of a polynomial equation, and also performs frame interpolation, inter-frame prediction and movement compensation based on the calculated polynomial equation.

17. A data processing apparatus according to claim 11, characterized by comprising a reference length division processing unit which refers to a coordinate point for sampling at predetermined periods, ensures regular valid lengths of equations, and thereby facilitates management of formularized data.

18. A data processing apparatus according to claim 11, characterized by comprising a multi-synthesis unit which synthesizes two or more gradation data in their formularized form.

19. A data processing apparatus according to claim 11, characterized by comprising:

a plurality of said continuous gradation compression apparatuses;

a plurality of said continuous gradation expansion apparatuses; and a parallel processing control unit which divides the data to be processed in a plurality of blocks and controls the plurality of said continuous gradation compression apparatuses and the plurality of said continuous gradation expansion apparatuses to cause them to perform independent processing for each block.

20. A continuous gradation compression method comprising the steps of:

dividing a plurality of data constituting image or acoustic data into groups of predetermined ranges;

expressing each of the divided plurality of groups in relation with a data value corresponding to a position within the predetermined range as a polynomial equation having said position as the variable;

calculating the coefficients to be assigned to each variable of said polynomial equation; and outputting the coefficient data obtained at said coefficient calculation step for each of the divided plurality of groups as compressed data within said predetermined range.

21. A continuous gradation expansion method that receives the coefficient data obtained by the continuous gradation compression method according to claim 20 and restores the image or acoustics based on the data, characterized by comprising the steps of:

inserting said coefficient in a predetermined polynomial equation;

calculating the data value corresponding to the position based on the polynomial equation calculated at said polynomial equation calculation step; and outputting said data value obtained at said expansion step as image or acoustic data.

22. A data processing electron device formed on a semiconductor substrate, comprising:

a processing unit which performs compression processing and expansion processing of input image or acoustics data;

a memory for storing compressed data;

a digital-to-analog converter which converts expanded data into analog signals; and a controlling unit which controls said processing unit, wherein said processing unit comprises:

data division means which divides a plurality of data constituting image or acoustic data into groups of predetermined ranges;

formula calculation means which expresses each of the divided plurality of groups in relation with a data value corresponding to a position within the predetermined range as a polynomial equation having said position as the variable;

coefficient calculation means which calculates the coefficients to be assigned to each variable of said polynomial equation, compressed data output means which outputs the coefficient data obtained by said coefficient calculation means for each of the divided plurality of groups as compressed data within said predetermined range polynomial equation calculation means which inserts said coefficient in a predetermined polynomial equation;

expansion means which calculates the pixel data value corresponding to the pixel position based on the polynomial equation calculated by said polynomial equation calculation means; and expanded data output means which outputs said data value obtained by said expansion means as image or acoustic data.

23. Memory medium storing a program for implementing a data compression method comprising the steps of:

dividing a plurality of data constituting image or acoustic data into groups of predetermined ranges;

expressing each of the divided plurality of groups in relation with a data value corresponding to a position within the predetermined range as a polynomial equation having said position as the variable;

calculating the coefficients to be assigned to each variable of said polynomial equation; and outputting the coefficient data obtained at said coefficient calculation step for each of the divided plurality of groups as compressed data within said predetermined range.

\* \* \* \* \*